(12) United States Patent
Seo et al.

(10) Patent No.: US 9,305,497 B2
(45) Date of Patent: Apr. 5, 2016

(54) SYSTEMS, DEVICES, AND METHODS FOR DRIVING AN ANALOG INTERFEROMETRIC MODULATOR

(71) Applicant: QUALCOMM MEMS Technologies, Inc., San Diego, CA (US)

(72) Inventors: Jae Hyeong Seo, Pleasanton, CA (US); Alok Govil, Fremont, CA (US); Ming-Hau Tung, San Francisco, CA (US); Russel A. Martin, Menlo Park, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 149 days.

(21) Appl. No.: 14/012,687

(22) Filed: Aug. 28, 2013

(65) Prior Publication Data
US 2014/0210866 A1 Jul. 31, 2014

Related U.S. Application Data

(60) Provisional application No. 61/696,065, filed on Aug. 31, 2012.

(51) Int. Cl.
*G09G 3/34* (2006.01)
*G02B 26/00* (2006.01)

(52) U.S. Cl.
CPC .............. *G09G 3/3466* (2013.01); *G02B 26/00* (2013.01); *G09G 2300/08* (2013.01); *G09G 2300/0819* (2013.01); *G09G 2310/0251* (2013.01); *G09G 2310/0262* (2013.01); *G09G 2310/061* (2013.01)

(58) Field of Classification Search
CPC .................. G09G 2300/08; G09G 2310/0251; G09G 2310/0262; G09G 2310/061; G09G 3/3466; G02B 26/001; G02B 26/0833; G02B 26/00; G02B 26/0841
USPC ............. 345/84–85, 108, 690, 208, 210, 211, 345/212; 359/247, 290–291, 295, 302
See application file for complete search history.

(56) References Cited

U.S. PATENT DOCUMENTS

| 4,954,789 A | 9/1990 | Sampsell |
| 5,519,565 A | 5/1996 | Kalt |

(Continued)

FOREIGN PATENT DOCUMENTS

| TW | 200624975 | 7/2006 |
| TW | 200626945 | 8/2006 |
| TW | I279919 | 4/2007 |

OTHER PUBLICATIONS

International Search Report and Written Opinion—PCT/US2013/057361—ISA/EPO—Jul. 11, 2013 (123975WO).

(Continued)

*Primary Examiner* — Hong Zhou
(74) *Attorney, Agent, or Firm* — Knobbe Martens Olson & Bear LLP

(57) ABSTRACT

Display elements of a display array include at least one fixed layer and a movable layer. The movable layer is positioned with respect to the at least one fixed layer by placing a charge on the movable layer and applying a voltage to the at least one fixed layer. The at least one fixed layer may be two layers positioned on either side of the movable layer. The movable layer may be positioned in a desired position when driving an array of display elements by executing a reset stage, a charging stage, and a bias stage.

23 Claims, 13 Drawing Sheets

(56) References Cited

U.S. PATENT DOCUMENTS

| | | | |
|---|---|---|---|
| 5,784,189 A | 7/1998 | Bozler et al. | |
| 6,040,937 A | 3/2000 | Miles | |
| 6,574,033 B1 | 6/2003 | Chui et al. | |
| 6,674,562 B1 | 1/2004 | Miles et al. | |
| 6,791,735 B2 | 9/2004 | Stappaerts | |
| 6,829,132 B2 * | 12/2004 | Martin et al. | 361/278 |
| 7,042,643 B2 | 5/2006 | Miles | |
| 7,072,093 B2 | 7/2006 | Piehl et al. | |
| 7,123,216 B1 | 10/2006 | Miles | |
| 7,245,285 B2 | 7/2007 | Yeh et al. | |
| 7,327,510 B2 | 2/2008 | Cummings et al. | |
| 7,463,403 B1 * | 12/2008 | Gaalema et al. | 359/290 |
| 7,529,433 B2 | 5/2009 | Kissa et al. | |
| 7,560,299 B2 | 7/2009 | Cummings | |
| 7,719,752 B2 | 5/2010 | Sampsell et al. | |
| 7,834,829 B2 * | 11/2010 | Martin et al. | 345/85 |
| 7,889,163 B2 | 2/2011 | Chui et al. | |
| 7,990,604 B2 | 8/2011 | Lee et al. | |
| 8,023,167 B2 | 9/2011 | Sampsell | |
| 8,174,306 B2 * | 5/2012 | Ikehashi | 327/536 |
| 8,193,441 B2 | 6/2012 | Kothari et al. | |
| 8,405,649 B2 | 3/2013 | Lewis et al. | |
| 2001/0028248 A1 | 10/2001 | Nekado | |
| 2002/0015215 A1 | 2/2002 | Miles | |
| 2004/0008396 A1 * | 1/2004 | Stappaerts | 359/245 |
| 2004/0246554 A1 | 12/2004 | Kaeriyama | |
| 2010/0245311 A1 * | 9/2010 | Lewis et al. | 345/208 |
| 2011/0261088 A1 * | 10/2011 | Seo et al. | 345/690 |
| 2011/0316832 A1 * | 12/2011 | Todorovich | 345/210 |
| 2012/0044237 A1 | 2/2012 | Hong et al. | |
| 2012/0056855 A1 * | 3/2012 | Zhang et al. | 345/204 |
| 2012/0188215 A1 | 7/2012 | Bushankuchu | |
| 2013/0135325 A1 | 5/2013 | Govil | |
| 2013/0293523 A1 | 11/2013 | Chan et al. | |

OTHER PUBLICATIONS

Taiwan Search Report—TW102131417—TIPO—May 1, 2015 (123975TW).

* cited by examiner

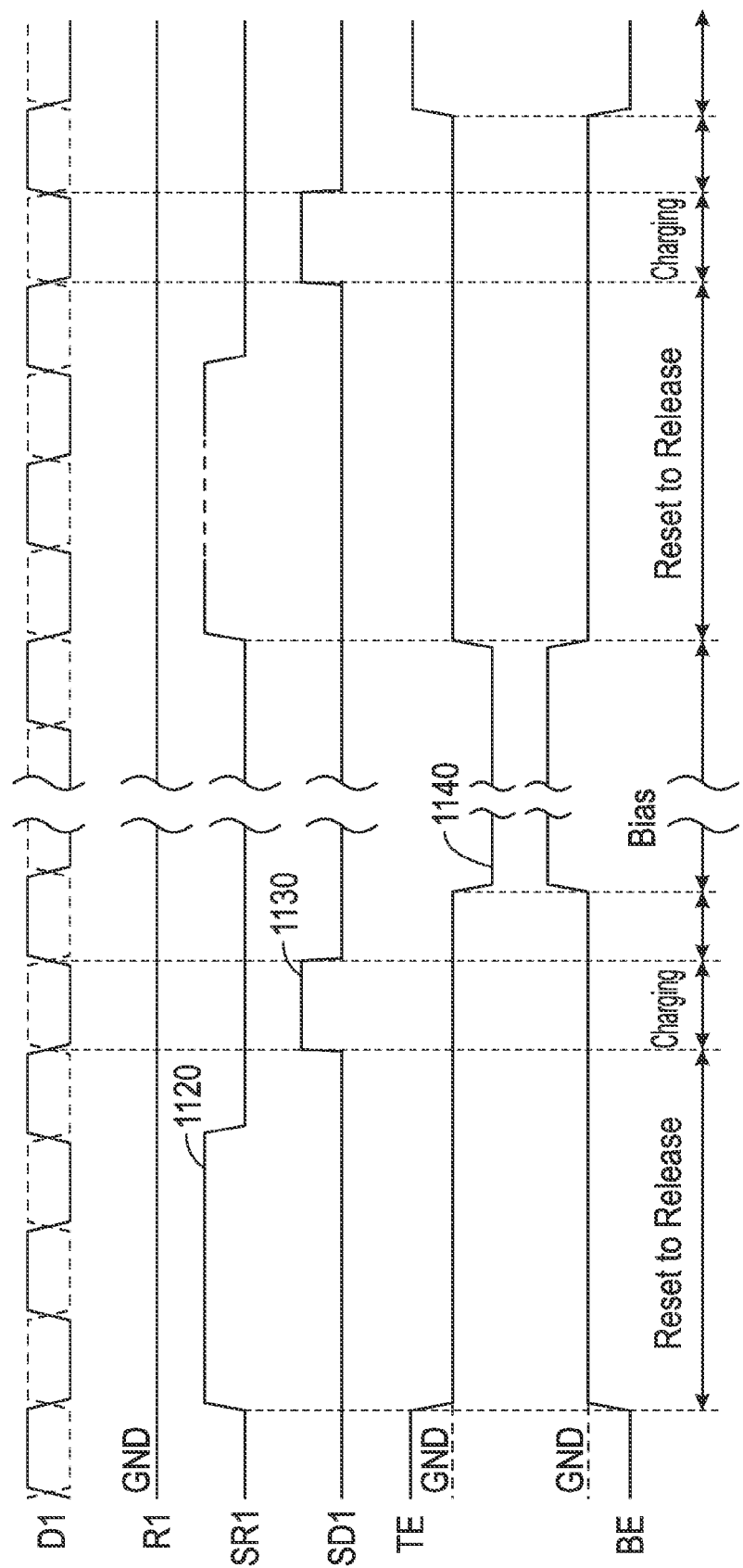

SYSTEMS, DEVICES, AND METHODS FOR DRIVING AN ANALOG INTERFEROMETRIC MODULATOR

CROSS-REFERENCE TO RELATED APPLICATIONS

This patent application claims priority to U.S. Provisional Patent Application No. 61/696,065 filed Aug. 31, 2012 entitled "Systems, Devices, and Methods for Driving An Analog Interferometric Modulator," and assigned to the assignee hereof. The disclosure of the prior application is considered part of and is incorporated by reference in this patent application.

TECHNICAL FIELD

This disclosure relates to devices and driving schemes for analog interferometric modulators and other display systems.

DESCRIPTION OF THE RELATED TECHNOLOGY

Electromechanical systems (EMS) include devices having electrical and mechanical elements, actuators, transducers, sensors, optical components such as mirrors and optical films, and electronics. EMS devices or elements can be manufactured at a variety of scales including, but not limited to, microscales and nanoscales. For example, microelectromechanical systems (MEMS) devices can include structures having sizes ranging from about a micron to hundreds of microns or more. Nanoelectromechanical systems (NEMS) devices can include structures having sizes smaller than a micron including, for example, sizes smaller than several hundred nanometers. Electromechanical elements may be created using deposition, etching, lithography, and/or other micromachining processes that etch away parts of substrates and/or deposited material layers, or that add layers to form electrical and electromechanical devices.

One type of EMS device is called an interferometric modulator (IMOD). The term IMOD or interferometric light modulator refers to a device that selectively absorbs and/or reflects light using the principles of optical interference. In some implementations, an IMOD display element may include a pair of conductive plates, one or both of which may be transparent and/or reflective, wholly or in part, and capable of relative motion upon application of an appropriate electrical signal. For example, one plate may include a stationary layer deposited over, on or supported by a substrate and the other plate may include a reflective membrane separated from the stationary layer by an air gap. The position of one plate in relation to another can change the optical interference of light incident on the IMOD display element. IMOD-based display devices have a wide range of applications, and are anticipated to be used in improving existing products and creating new products, especially those with display capabilities.

SUMMARY

The systems, methods and devices of this disclosure each have several innovative aspects, no single one of which is solely responsible for the desirable attributes disclosed herein.

One innovative aspect of the subject matter described in this disclosure can be implemented in a method of writing image data to an electromechanical display element to place the electromechanical display element into a defined display state. The display element may include at least one stationary electrode and a movable electrode. The method may include applying a first voltage to the at least one stationary electrode during a reset period, applying a second voltage to the at least one stationary electrode during a charging period following the reset period, applying a third voltage to the movable electrode during the charging period to charge the movable electrode with a charge Q defined at least in part by the third voltage, applying a fourth voltage different from the second voltage to the at least one stationary electrode during a bias period following the charging period, and electrically isolating the movable electrode during the bias period. In some of these implementations, the electromechanical display element includes first and second stationary electrodes, and the movable electrode is positioned between the first and second stationary electrodes. In these implementations, the first voltage, second voltage, and fourth voltage may be a first voltage differential, a second voltage differential, and a fourth voltage differential applied across the first stationary electrode and the second stationary electrode.

Another innovative aspect of the subject matter described in this disclosure can be implemented in a display apparatus. The display apparatus may include an array of electromechanical display elements, each electromechanical display element including at least one stationary electrode and a movable electrode. A driver circuit may be coupled to the array and configured to apply a first voltage to the at least one stationary electrode during a reset period, apply a second voltage to the at least one stationary electrode during a charging period following the reset period, apply a third voltage to the movable electrode during the charging period to charge the movable electrode with a charge Q defined at least in part by the third voltage, apply a fourth voltage different from the second voltage to the at least one stationary electrode during a bias period following the charging period, and electrically isolate the movable electrode during the bias period. In some implementations, the first and second stationary electrodes are formed as parallel strips of conductive material connected to the driver circuit. In some implementations, the movable electrode is supported between the parallel strips of conductive material on conductive support arms attached to a substrate. In some implementations, the support arms may provide a conductive connection between drive transistors and the movable electrode.

Another innovative aspect of the subject matter described in this disclosure can also be implemented in a display apparatus. The display apparatus may include an array of electromechanical display elements, each electromechanical display element including at least one stationary electrode and a movable electrode. The display apparatus may also include means for applying resetting voltages to at least the at least one stationary electrode for resetting display elements of the array, means for applying charging voltages to the at least one stationary electrode and movable electrode for charging the movable electrodes of the display elements of the array, and means for applying biasing voltages to at least the at least one stationary electrode different from the charging voltages applied to the at least one stationary electrode for setting display elements of the array to a defined display state.

Details of one or more implementations of the subject matter described in this disclosure are set forth in the accompanying drawings and the description below. Although the examples provided in this disclosure are primarily described in terms of EMS and MEMS-based displays the concepts provided herein may apply to other types of displays such as liquid crystal displays, organic light-emitting diode ("OLED") displays, and field emission displays. Other features, aspects, and advantages will become apparent from the description, the drawings and the claims. Note that the relative dimensions of the following figures may not be drawn to scale.

BRIEF DESCRIPTION OF THE DRAWINGS

FIGS. 10A and 10B are timing diagrams illustrating data and scan line signals and top and bottom electrode voltages that may be used to write data to display elements in the implementation of FIG. 9A.

Like reference numbers and designations in the various drawings indicate like elements.

DETAILED DESCRIPTION

Figure 1A:
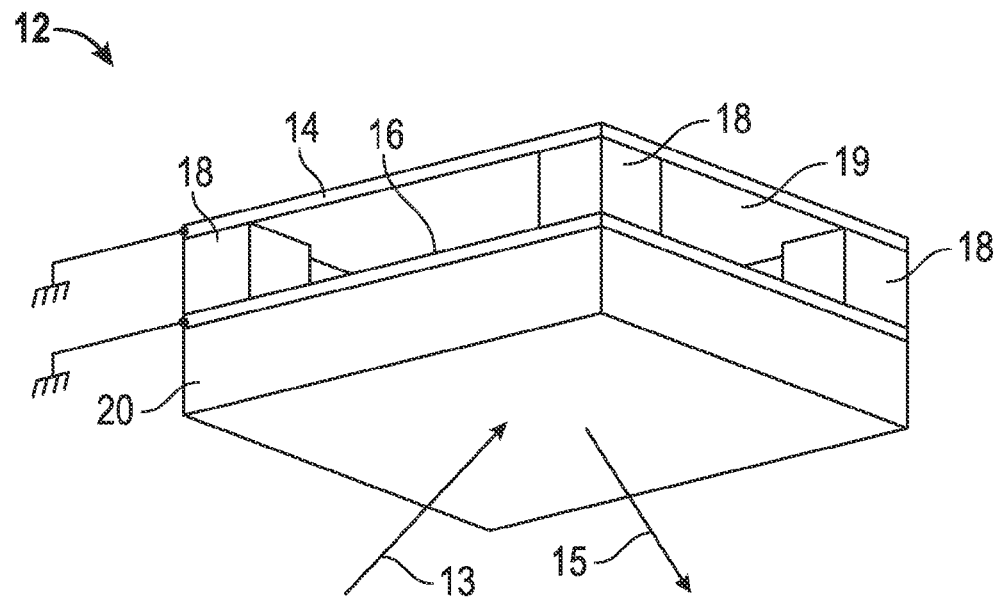
FIGS. 1A and 1B show examples of isometric views depicting a pixel of an interferometric modulator (IMOD) display device in two different states.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, apparatus, or system that can be configured to display an image, whether in motion (such as video) or stationary (such as still images), and whether textual, graphical or pictorial. More particularly, it is contemplated that the described implementations may be included in or associated with a variety of electronic devices such as, but not limited to: mobile telephones, multimedia Internet enabled cellular telephones, mobile television receivers, wireless devices, smartphones, Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also can be used in non-display applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

An active matrix display apparatus may include switch circuitry in addition to a display element at each pixel of a display array. In implementations described herein, switch designs and layouts may implement an active matrix system for a display array using interferometric modulators. The layout may tightly place the circuitry at each display element to reduce the impact on fill factor. A black mask may be used to block visual detection of the circuitry at each display element.

Particular implementations of the subject matter described in this disclosure can be implemented to realize one or more of the following potential advantages. Implementations described herein provide drive schemes for accurate analog control of electromechanical display elements using relatively fast charge transfer to and from the display elements. Faster image frame writing is possible with such a charge controlled drive scheme over a voltage controlled drive scheme as no waiting for mechanical stabilization of the display element is needed. The implementations may produce nearly linear response of the display elements to deposited charge, while reducing the impact of common sources of error in electrode placement such as uncertainties in display element position during charge transfer. This error reduction may be accomplished by resetting the display element to a known state with a known capacitance. The drive scheme implementations also allow the use of a small number of drive transistors, with only one or two drive transistors per display elements being sufficient in many implementations. In some implementations, resetting display elements to a high capacitance position reduces power consumption by lowering drive voltages for transferring charge. Furthermore, when fixed charges are trapped on the display element, stiction control may be implemented by producing an electrostatic repelling force between portions of the display elements.

An example of a suitable EMS or MEMS device or apparatus, to which the described implementations may apply, is a reflective display device. Reflective display devices can incorporate interferometric modulator (IMOD) display elements that can be implemented to selectively absorb and/or reflect light incident thereon using principles of optical interference. IMOD display elements can include a partial optical absorber, a reflector that is movable with respect to the absorber, and an optical resonant cavity defined between the absorber and the reflector. In some implementations, the reflector can be moved to two or more different positions, which can change the size of the optical resonant cavity and thereby affect the reflectance of the IMOD. The reflectance spectra of IMOD display elements can create fairly broad spectral bands that can be shifted across the visible wavelengths to generate different colors. The position of the spectral band can be adjusted by changing the thickness of the optical resonant cavity. One way of changing the optical resonant cavity is by changing the position of the reflector with respect to the absorber.

Figure 1B:
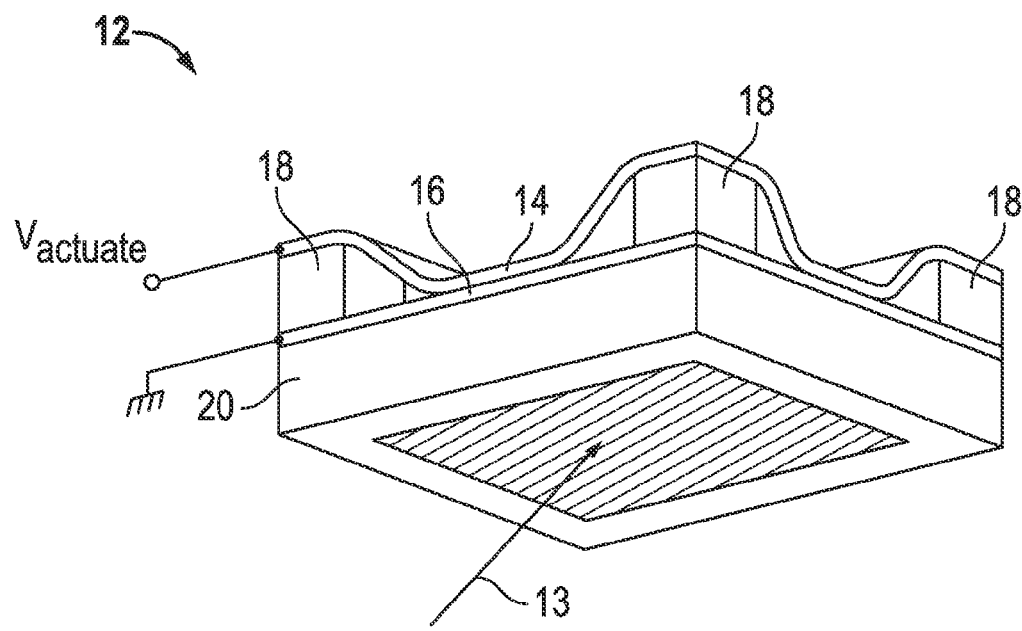

FIGS. 1A and 1B show examples of isometric views depicting a pixel of an interferometric modulator (IMOD) display device in two different states. The IMOD display device includes one or more interferometric MEMS display elements. In these devices, the pixels of the MEMS display elements can be in either a bright or dark state. In the bright ("relaxed," "open" or "on") state, the display element reflects a large portion of incident visible light, e.g., to a user. Conversely, in the dark ("actuated," "closed" or "off") state, the display element reflects little incident visible light. In some implementations, the light reflectance properties of the on and off states may be reversed. MEMS pixels can be configured to reflect predominantly at particular wavelengths allowing for a color display in addition to black and white.

The IMOD display device can include a row/column array of IMODs. Each IMOD can include a pair of reflective layers, i.e., a movable reflective layer and a fixed partially reflective layer, positioned at a variable and controllable distance from each other to form an air gap (also referred to as an optical gap or cavity). The movable reflective layer may be moved between at least two positions. In a first position, i.e., a relaxed position, the movable reflective layer can be positioned at a relatively large distance from the fixed partially reflective layer. In a second position, i.e., an actuated position, the movable reflective layer can be positioned more closely to the partially reflective layer. Incident light that reflects from the two layers can interfere constructively or destructively depending on the position of the movable reflective layer, producing either an overall reflective or non-reflective state for each pixel. In some implementations, the IMOD may be in a reflective state when unactuated, reflecting light within the visible spectrum, and may be in a dark state when unactuated, reflecting light outside of the visible range (e.g., infrared light). In some other implementations, however, an IMOD may be in a dark state when unactuated, and in a reflective state when actuated. In some implementations, the introduction of an applied voltage can drive the pixels to change states. In some other implementations, an applied charge can drive the pixels to change states.

The depicted pixels in FIGS. 1A and 1B depict two different states of an IMOD 12. In the IMOD 12 in FIG. 1A, a movable reflective layer 14 is illustrated in a relaxed position at a predetermined (e.g., designed) distance from an optical stack 16, which includes a partially reflective layer. Since no voltage is applied across the IMOD 12 in FIG. 1A, the movable reflective layer 14 remained in a relaxed or unactuated state. In the IMOD 12 in FIG. 1B, the movable reflective layer 14 is illustrated in an actuated position and adjacent, or nearly adjacent, to the optical stack 16. The voltage $V_{actuate}$ applied across the IMOD 12 in FIG. 1B is sufficient to actuate the movable reflective layer 14 to an actuated position.

In FIGS. 1A and 1B, the reflective properties of pixels 12 are generally illustrated with arrows 13 indicating light incident upon the pixels 12, and light 15 reflecting from the pixel 12 on the left. Although not illustrated in detail, it will be understood by a person having ordinary skill in the art that most of the light 13 incident upon the pixels 12 will be transmitted through the transparent substrate 20, toward the optical stack 16. A portion of the light incident upon the optical stack 16 will be transmitted through the partially reflective layer of the optical stack 16, and a portion will be reflected back through the transparent substrate 20. The portion of light 13 that is transmitted through the optical stack 16 will be reflected at the movable reflective layer 14, back toward (and through) the transparent substrate 20. Interference (constructive or destructive) between the light reflected from the partially reflective layer of the optical stack 16 and the light reflected from the movable reflective layer 14 will determine the wavelength(s) of light 15 reflected from the pixels 12.

The optical stack 16 can include a single layer or several layers. The layer(s) can include one or more of an electrode layer, a partially reflective and partially transmissive layer and a transparent dielectric layer. In some implementations, the optical stack 16 is electrically conductive, partially transparent and partially reflective, and may be fabricated, for example, by depositing one or more of the above layers onto a transparent substrate 20. The electrode layer can be formed from a variety of materials, such as various metals, for example indium tin oxide (ITO). The partially reflective layer can be formed from a variety of materials that are partially reflective, such as various metals, e.g., chromium (Cr), semiconductors, and dielectrics. The partially reflective layer can be formed of one or more layers of materials, and each of the layers can be formed of a single material or a combination of materials. In some implementations, the optical stack 16 can include a single semi-transparent thickness of metal or semiconductor which serves as both an optical absorber and conductor, while different, more conductive layers or portions (e.g., of the optical stack 16 or of other structures of the IMOD) can serve to bus signals between IMOD pixels. The optical stack 16 also can include one or more insulating or dielectric layers covering one or more conductive layers or a conductive/absorptive layer.

In some implementations, a highly conductive and reflective material, such as aluminum (Al), may be used for the movable reflective layer 14. The movable reflective layer 14 may be formed as a metal layer or layers deposited on top of posts 18 and an intervening sacrificial material deposited between the posts 18. When the sacrificial material is etched away, a defined gap 19, or optical cavity, can be formed between the movable reflective layer 14 and the optical stack 16. In some implementations, the spacing between posts 18 may be on the order of 1-1000 um, while the gap 19 may be on the order of <10,000 Angstroms (Å).

In some implementations, each pixel of the IMOD, whether in the actuated or relaxed state, is essentially a capacitor formed by the fixed and moving reflective layers. When no voltage is applied, the movable reflective layer 14a remains in a mechanically relaxed state, as illustrated by the pixel 12 in FIG. 1A, with the gap 19 between the movable reflective layer 14 and optical stack 16. However, when a potential difference, e.g., voltage, is applied to at least one of the movable reflective layer 14 and optical stack 16, the capacitor formed at the corresponding pixel becomes charged, and electrostatic forces pull the electrodes together. If the applied voltage exceeds a threshold, the movable reflective layer 14 can deform and move near or against the optical stack 16. A dielectric layer (not shown) within the optical stack 16 may prevent shorting and control the separation distance between the layers 14 and 16, as illustrated by the actuated pixel 12 in FIG. 1B. The behavior is the same regardless of the polarity of the applied potential difference. Though a series of pixels in an array may be referred to in some instances as "rows" or "columns," a person having ordinary skill in the art will readily understand that referring to one direction as a "row" and another as a "column" is arbitrary. Restated, in some orientations, the rows can be considered columns, and the columns considered to be rows. Furthermore, the display elements may be evenly arranged in orthogonal rows and columns (an "array"), or arranged in non-linear configurations, for example, having certain positional offsets with respect to one another (a "mosaic"). The terms "array" and "mosaic" may refer to either configuration. Thus, although the display is referred to as including an "array" or "mosaic," the elements themselves need not be arranged orthogonally to one another, or disposed in an even distribution, in any instance, but may include arrangements having asymmetric shapes and unevenly distributed elements.

In some implementations, such as in a series or array of IMODs, the optical stacks 16 can serve as a common electrode that provides a common voltage to one side of the IMODs 12. The movable reflective layers 14 may be formed as an array of separate plates arranged in, for example, a matrix form. The separate plates can be supplied with voltage signals for driving the IMODs 12.

In implementations such as those shown in FIGS. 1A and 1B, the IMODs function as direct-view devices, in which images are viewed from the front side of the transparent substrate 20, i.e., the side opposite to that upon which the modulator is arranged. In these implementations, the back portions of the device can be configured and operated upon without impacting or negatively affecting the image quality of the display device, because the reflective layer 14 optically shields those portions of the device.

Figure 2:
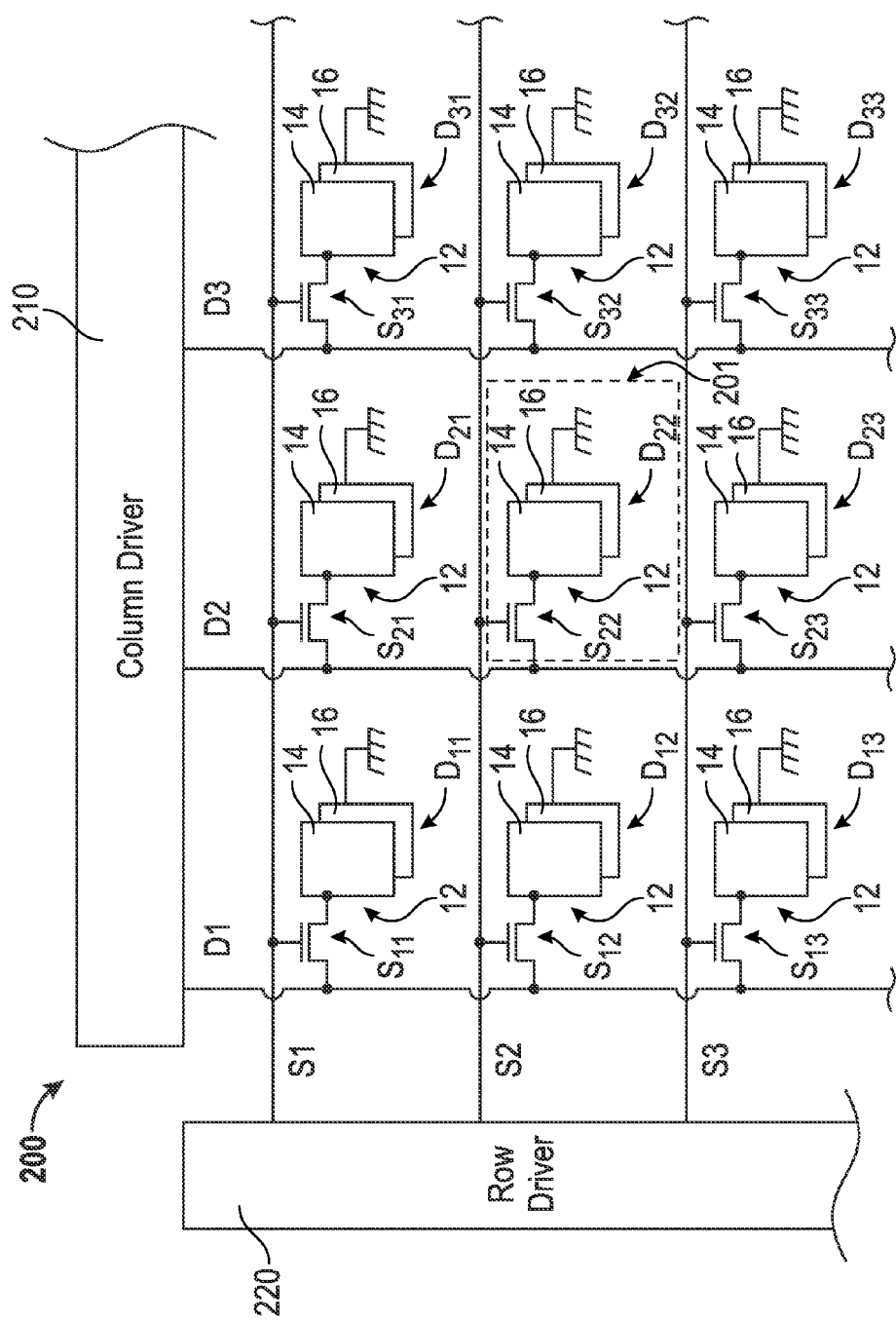
FIG. 2 shows an example of a schematic circuit diagram illustrating a driving circuit array for an optical MEMS display device.

FIG. 2 shows an example of a schematic circuit diagram illustrating a driving circuit 200 for an optical MEMS display device. The driving circuit array 200 can be used for implementing an active matrix addressing scheme for providing image data to display elements $D_{11}$-$D_{mn}$ of a display array assembly.

The driving circuit 200 includes a column driver 210, a row driver 220, first to m-th data lines D1-Dm, first to n-th scan lines S1-Sn, and an array of switches or switching circuits $S_{11}$-$S_{mn}$. Each of the data lines D1-Dm extends from the column driver 210, and is electrically connected to a respective column of switches $S_{11}$-$S_{1n}$, $S_{21}$-$S_{2n}$, . . . , $S_{m1}$-$S_{mn}$. Each of the scan lines S1-Sn extends from the row driver 220, and is electrically connected to a respective row of switches $S_{11}$-$S_{m1}$, $S_{12}$-$S_{m2}$, . . . , $S_{1n}$-S. The switches $S_{11}$-$S_{mn}$ are electrically coupled between one of the data lines D1-Dm and a respective one of the display elements $D_{11}$-$D_{mn}$ and receive a switching control signal from the row driver 220 via one of the scan lines S1-Sn.

The column driver 210 can receive image data from outside the display and can provide the image data on a row by row basis in a form of voltage signals to the switches $S_{11}$-$S_{mn}$ via the data lines D1-Dm. The gate driver 220 can select a particular row of display elements $D_{11}$-$D_{m1}$, $D_{12}$-$D_{m2}$, . . . , $D_{1n}$-$D_{mn}$ by turning on the switches $S_{11}$-$S_{m1}$, $S_{12}$-$S_{m2}$, . . . , $S_{1n}$-$S_{mn}$ associated with the selected row of display elements $D_{11}$-$D_{m1}$, $D_{12}$-$D_{m2}$, . . . , $D_{1n}$-$D_{mn}$. When the switches $S_{11}$-$S_{m1}$, $S_{12}$-$S_{m2}$, . . . , $S_{1n}$-$S_{mn}$ in the selected row are turned on, the image data from the column driver 210 is passed to the selected row of display elements $D_{11}$-$D_{m1}$, $D_{12}$-$D_{m2}$, . . . , $D_{1n}$-$D_{mn}$.

During operation, the row driver 220 can provide a voltage signal via one of the scan lines S1-Sn to the gates of the switches $S_{11}$-$S_{mn}$ in a selected row, thereby turning on the switches $S_{11}$-$S_{mn}$. After the column driver 210 provides image data to all of the data lines D1-Dm, the switches $S_{11}$-$S_{mn}$ of the selected row can be turned on to provide the image data to the selected row of display elements $D_{11}$-$D_{m1}$, $D_{12}$-$D_{m2}$, . . . , $D_{1n}$-$D_{mn}$, thereby displaying a portion of an image. For example, data lines that are associated with display elements that are to be actuated in the row can be set to, e.g., ±10-volts (could be positive or negative), and data lines that are associated with pixels that are to be released in the row can be set to, e.g., 0-volts. Then, the scan line for the given row is asserted, turning the switches in that row on, and applying the selected data line voltage to each display element of that row. This charges and actuates the pixels that have ±10-volts applied, and discharges and releases the pixels that have 0-volts applied. Then, the switches $S_{11}$-$S_{mn}$ can be turned off. The display elements $D_{11}$-$D_{m1}$, $D_{12}$-$D_{m2}$, . . . , $D_{1n}$-$D_{mn}$ can hold the image data because the charge on the actuated pixels will be retained when the switches are off, except for some leakage through insulators and the off state switch. Generally, this leakage is low enough to retain the image data on the display elements until another set of data is written to the row. These steps can be repeated to each succeeding row until all of the rows have been selected and image data has been provided thereto. In the implementation of FIG. 2, the optical stack 16 is grounded at each pixel, although other voltage levels could be utilized on the optical stack 16. In some implementations, this may be accomplished by depositing a continuous optical stack 16 onto the substrate and grounding the entire sheet (or tying the entire sheet to some other voltage level) at the periphery of the deposited layers.

Figure 3:
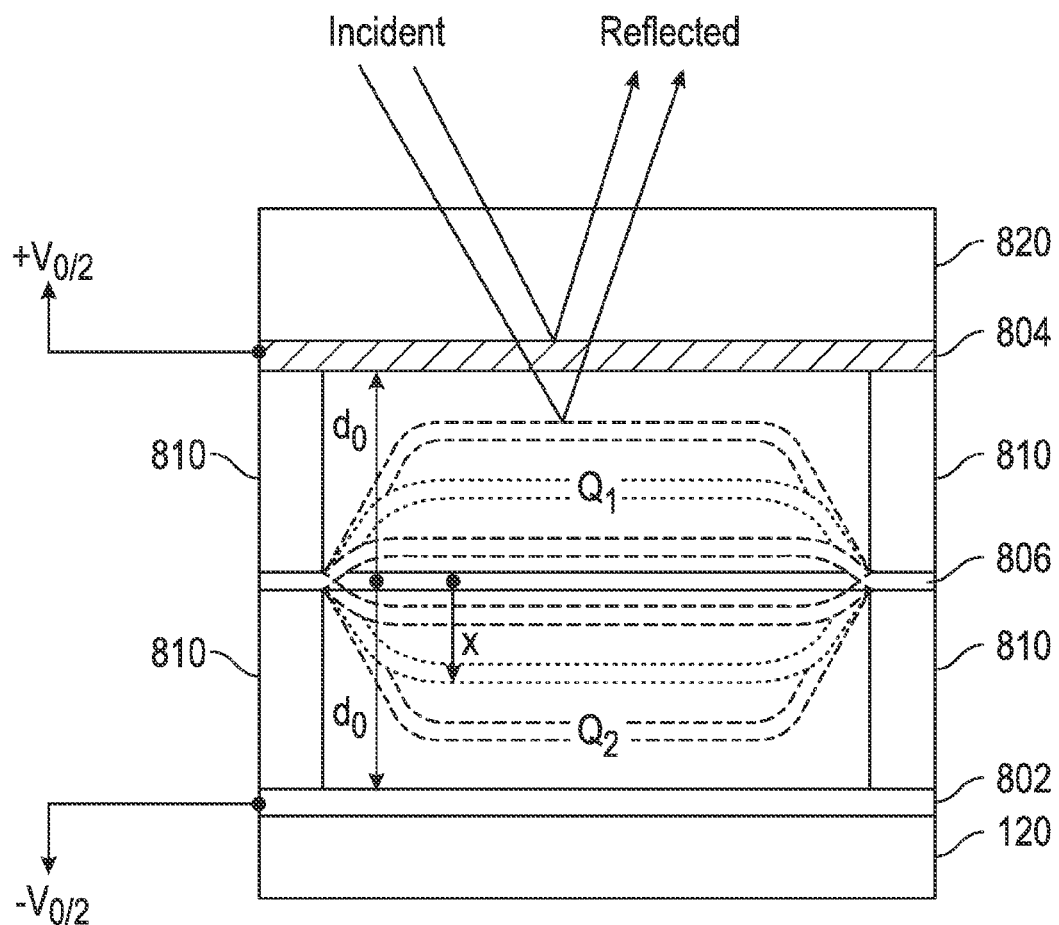
FIG. 3 shows a cross-section of an implementation of an analog interferometric modulator having two fixed layers and a movable third layer.

FIG. 3 shows a cross-section of an implementation of an interferometric modulator having two fixed layers and a movable third layer. Specifically, FIG. 3 shows an implementation of an analog interferometric modulator having a fixed first layer 802 (alternatively referred to as a stationary electrode, fixed conductive layer, or a top electrode), a fixed second layer 804 (alternatively referred to as a stationary electrode, fixed conductive layer, or a bottom electrode), and a movable third layer 806 (alternatively referred to as an image input electrode, movable conductive layer, or a movable electrode) positioned between the fixed first and second layers 802 and 804. Each of the layers 802, 804, and 806 may include an electrode or other conductive material. For example, the fixed first layer 802 may include a plate made of metal. Each of the layers 802, 804, and 806 may be stiffened using a stiffening layer formed on or deposited on the respective layer. In one implementation, the stiffening layer includes a dielectric. The stiffening layer may be used to keep the layer to which it is attached rigid and substantially flat. Some implementations of the interferometric modulator may be referred to as a three-terminal interferometric modulator. Certain of the implementations described herein may be implemented by omitting one of the top or bottom electrodes (e.g., fixed first layer 802 or fixed second layer 804).

In the implementation of FIG. 3, The three layers 802, 804, and 806 are electrically insulated by insulating posts 810. The movable third layer 806 is suspended from the insulating posts 810. The movable third layer 806 is configured to deform such that the movable third layer 806 may be displaced in a generally upward direction toward the fixed first layer 802, or may be displaced in a generally downward direction toward to the fixed second layer 804. In some implementations, the fixed first layer 802 may also be referred to as the top layer or top electrode. In some implementations, the fixed second layer 804 may also be referred to as the bottom layer or bottom electrode. The interferometric modulator 800 may be supported by a substrate 820.

In FIG. 3, the movable third layer 806 is illustrated as being in an equilibrium position with the solid lines. The equilibrium position is the position at which the movable layer comes to rest when no charge is on the movable layer and no voltage is applied to the top and bottom electrodes. In the specific implementation illustrated in FIG. 3, the equilibrium position of the middle layer is essentially centered between the top electrode and the bottom electrode, although this is not necessarily the case. As illustrated in FIG. 3 then, $d_0$ corresponds to the nominal distance between each fixed layer 802, 804 and the movable third layer 806 in the equilibrium state. The position of the movable third layer 806 from the equilibrium position between the fixed first layer 802 and fixed second layer 806 may be indicated by a value x, where a positive value of x corresponds to a position closer to the fixed first layer 802 and a negative value of x corresponds to a distance that is farther from the fixed first layer 802. When positioned at a substantial midpoint between the fixed first layer 802 and the fixed second layer 804, the position of the movable third layer 806 may correspond to a nominal position $x_0$. In some implementations, the device can be configured so that electrostatic forces will pull the electrode 806 away from the equilibrium position, and mechanical restoring forces will pull the electrode 806 toward the equilibrium position. The position x of the central layer 806 will be determined by a balance of these forces at any given time.

As illustrated in FIG. 3, a voltage difference may be applied between the fixed first layer 802 and the fixed second layer 804. In the implementation of FIG. 3, a voltage difference of $V_0$ is applied across the fixed layers, which may be applied in one specific example as a voltage of $-V_0/2$ applied to fixed first layer 802 and a voltage $+V_0/2$ applied to the fixed second layer 804. If a fixed charge Q is present on the movable third layer 806, then if that charge Q is negative, the movable third layer 806 will be electrostatically pulled toward fixed second layer 804. If that charge Q is positive, the movable third layer 806 will be electrostatically pulled toward fixed first layer 802. If the charge Q is zero, the movable layer 806 will move to the equilibrium position, regardless of the magnitude of $V_0$. If the charge Q is greater than a "critical charge" $Q_{cr}$, then the movable layer 806 will become unstable, and will move to $+d_0$ or $-d_0$ regardless of the magnitude of $V_0$, even zero volts. The critical charge $Q_{cr}$ depends on the construction parameters of the device, and for a movable layer with equilibrium position equidistant from each fixed layer is equal to the square root of $2C_0(d_0)^2k$, where $C_0$ is the capacitance of the capacitor defined by the movable layer 806 and one of the fixed layers 802, 804 when the movable layer is in the equilibrium position, and k is the spring constant of the mechanical restoring force. By applying a variable charge to the movable third layer 806 that is between the voltages on fixed first and second layers 802 and 804, the movable third layer 806 can be positioned at a desired location between fixed first and second layers 802 and 804, producing a desired optical response. For charges less than $Q_{cr}$, the position x of the movable layer 806 will be:

$$x = QV_0C_0d_0[Q_{cr}^2 - Q^2]^{-1} \quad \text{Equation 1}$$

If the device is driven with charges Q that are much less than $Q_{cr}$, the deflection x of the movable layer 806 will be essentially linear with charge Q for a fixed voltage $V_0$. If the magnitude of $V_0$ is sufficiently large, full deflection from 0 to $\pm d_0$ can be obtained with charge levels $\pm Q$ that are significantly smaller than $Q_{cr}$. This produces well controlled deflection over the entire range of motion of the movable layer 806. As can also be seen from Equation 1, if Q is less than $Q_{cr}$, the movable layer will move to the equilibrium position if $V_0$ is taken to zero, even in the presence of the charge Q on the movable layer.

The voltage difference $V_0$ between the fixed first and second layers 802 and 804 can vary widely depending on the materials and construction of the device, and in many implementations may be in the range of about 5-20 volts. As with the two layer device described above with reference to FIGS. 1A and 1B, the movable third layer 806 may include a mirror to reflect light entering the interferometric modulator through substrate 820. The mirror may include a metal material. The fixed second layer 804 may include a partially absorbing material such that the fixed second layer 804 acts as an absorbing layer. When light reflected from the movable third layer 806 is viewed from the side of the substrate 820, the viewer may perceive the reflected light as a certain color. By adjusting the position of the movable third layer 806, certain wavelengths of light may be selectively reflected.

Figure 4:
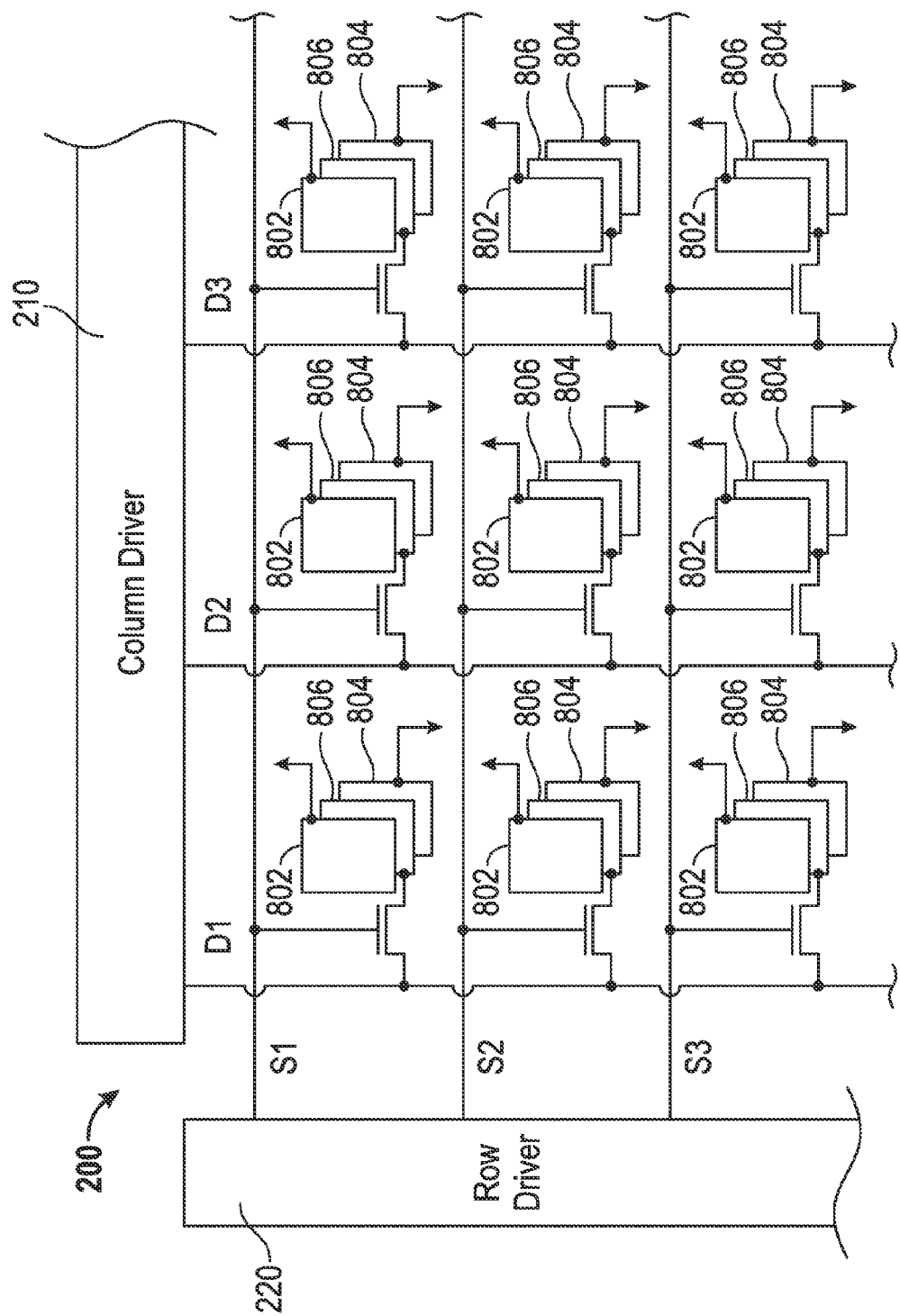
FIG. 4 shows an example of a schematic circuit diagram illustrating a driving circuit array for a display device having the structure of FIG. 3.

FIG. 4 shows an example of a schematic circuit diagram illustrating a driving circuit array for a display device having the structure of FIG. 3. The overall apparatus shares many similarities to the structure of FIG. 2. As shown in FIG. 4, however, an additional upper layer, corresponding to fixed first layer 802, is provided for each display element. The fixed first layer 802 may be deposited on the underside of a backplate, and may have a voltage $+V_0/2$ applied thereto as described with reference to FIG. 3. The fixed second layer 804 may have a voltage $-V_0/2$ applied thereto as described with reference to FIG. 3. These implementations may be driven in a manner similar to that described above with reference to FIG. 2, except the voltages provided on the data lines D1-Dm can be placed at a range of voltages to produce a variable charge Q, rather than at one of only two different voltages. In this way, the movable third layers 806 of the display elements along a row can each be independently placed in any particular desired position between the upper and lower layers (e.g., the fixed first layer 802 and the fixed second layer 804) when the row is written by asserting the scan line for that particular row. Various drive schemes for reliably placing a desired charge Q onto each movable layer of an array are described further below with reference to FIGS. 10A-10C.

Figure 5:
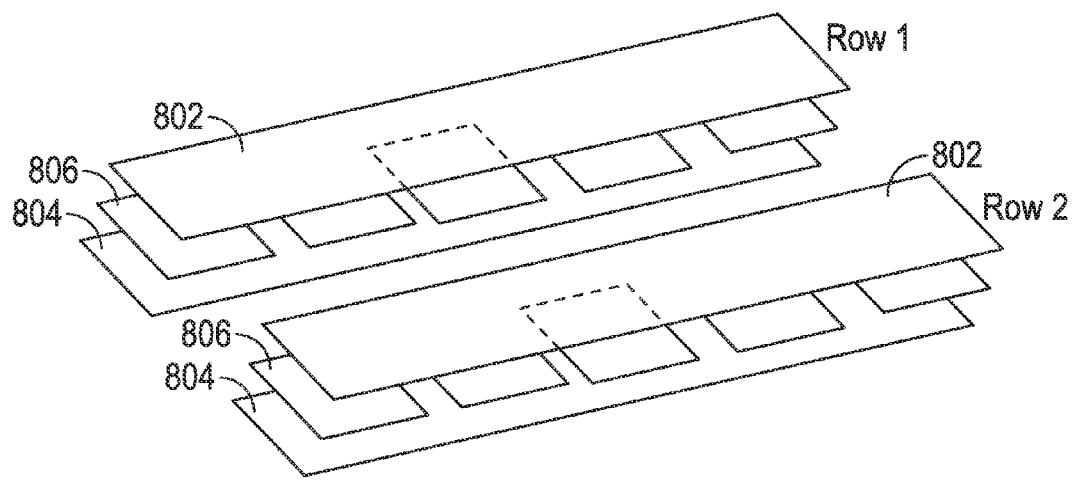
FIG. 5 shows an isometric view of two rows of an array of interferometric modulators according to one implementation.

FIG. 5 shows an isometric view of two rows of an array of interferometric modulators according to one implementation. In implementations according to FIG. 5, the top electrode 802 and the bottom electrode 804 may be formed as electrically conductive strips along each row that are each coupled to an output of a driver circuit. In these implementations, the voltages applied to the top and bottom electrodes 802 and 804 along a row can be controlled by the driver along with the voltage applied to the movable electrode 806.

Figure 6:
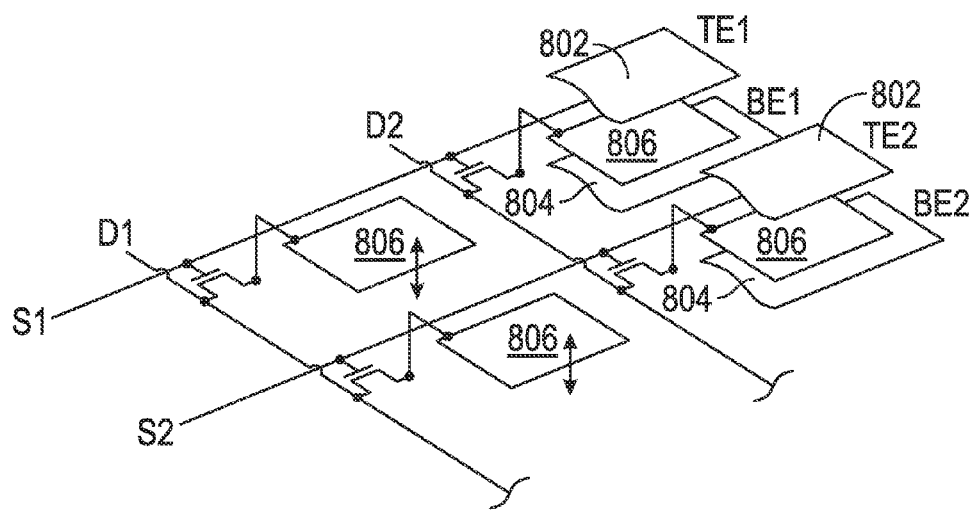
FIG. 6 shows a driving circuit array coupled to the electrodes of FIG. 5

FIG. 6 illustrates a driving circuit array coupled to the electrodes of FIG. 5. FIG. 6 is an implementation with a single drive transistor. FIG. 6 shows four display elements in a display array. Each display element includes two stationary electrodes, e.g. a top electrode 802 and a bottom electrode 804 (which are cut away for clarity of illustration) and a movable electrode 806. The top electrode may be in communication with a driver circuit, where the communication is represented by electrical connection in the circuit to TE1 or to TE2. The bottom electrode may be in communication with a driver circuit. The bottom electrode may be in communication with a driver circuit, where the communication is represented by electrical connection in the circuit to BE1 or to BE2. For an array of N rows, there will be TE1 to TEN and BE1 to BEN. These drive lines can be used to control the voltage applied to the top electrode 802 and bottom electrode 804 independently for each row.

Each display element further includes an associated drive transistor. The source electrode of the drive transistor may be connected to a data line, e.g., D1 or D2. The gate electrode of the drive transistor may be connected to a scan line (alternatively referred to as a gate line), e.g., S1 or S2. The drain electrode may be connected to the movable electrode 806.

Figure 7A:
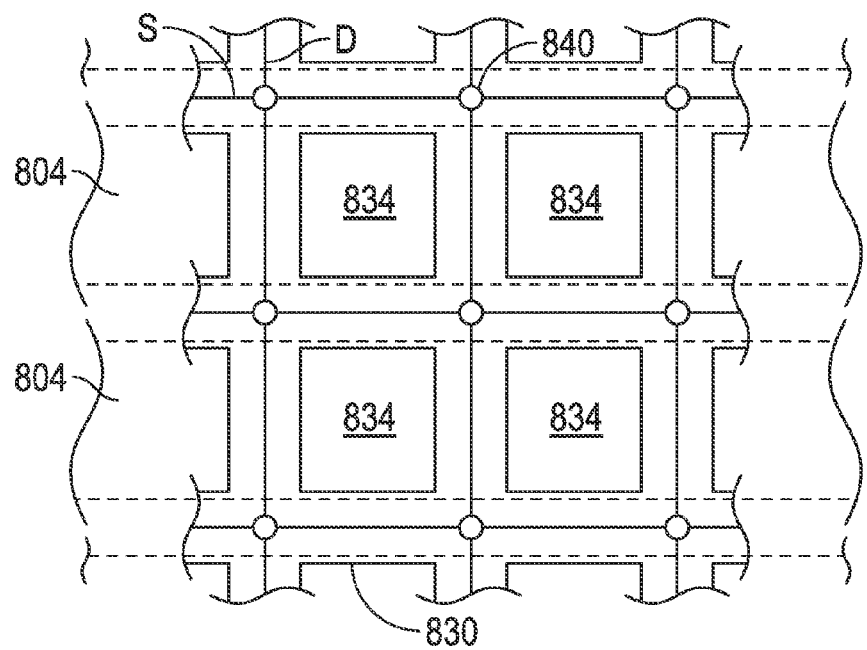
FIG. 7A shows an example of a display element array illustrating, in plan view, a layout of interferometric modulators, black mask, scan lines, data lines, and locations of output vias.
Figure 9A:
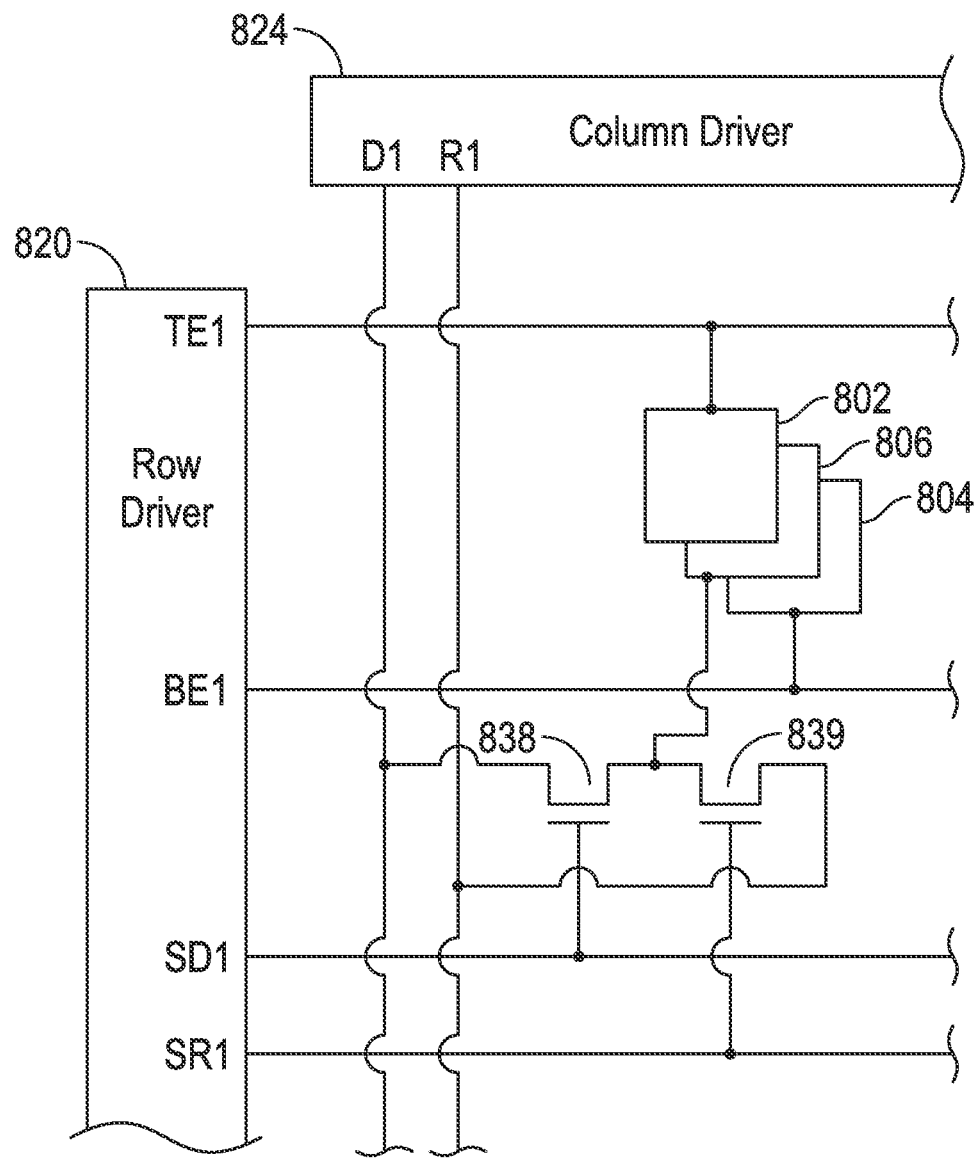
FIG. 9A shows an example of a schematic circuit diagram illustrating a driving circuit for an array of interferometric modulators.

The display array of FIG. 6 can be constructed in a variety of ways. In one implementation, data lines, scan lines, and drive transistors are deposited on the transparent substrate (designated 20 in FIG. 1 for example) on different layers of a material stack. In some implementations, additional lines such as reset lines and more than one transistor can be similarly deposited, such as when the circuit of FIG. 9A is utilized. The bottom electrode 804 may be deposited on top of these. The movable layer 806 and top electrode 802 may be deposited in further layers with sacrificial material in between the electrodes, which is then etched away to form the air gaps between the movable electrode 806 and the top and bottom electrodes 802, 804. In some implementations, the top electrode is deposited on a backplate that is placed over the fabricated substrate with movable electrodes 806 in a manner aligned with the rows of display elements on the substrate and maintaining an air gap therebetween. When producing a display array, it is desirable to utilize as much of the surface area of the substrate for the optical portion of the display elements. In an active matrix display, the drive lines and drive transistors can consume a significant amount of space, and be visible to a user through the substrate. As illustrated in FIG. 7A, a black mask pattern may also be deposited on the substrate to obscure the drive circuits integrated with the display elements from user visibility. It is desirable for this black mask pattern to have as little area as possible, and accordingly, layouts for drive circuits are presented below to minimize the footprint of the drive circuits so as to utilize a large amount of the substrate surface for the optical portion of the display elements.

FIG. 7A shows an example of a display element array illustrating, in plan view, a layout of interferometric modulators, black mask, scan lines, data lines, and locations of output vias. As illustrated in FIG. 7A, a black mask grid 830 can be deposited on substrate 820. This grid defines viewing areas 834. The black mask may be deposited in a grid with row lines and orthogonal column lines. In other implementations, the row and column lines may be substantially orthogonal or may not be orthogonal, e.g., the column lines may be at an angle from the row lines, e.g., 30 degrees from the perpendicular. The black mask may be formed from a thin partially reflecting metal layer and a thicker fully reflective layer separated by a thin dielectric. This can produce destructive interference of reflected light, producing a dark visual area where the black mask is deposited when viewing the substrate, according to the same principles described above with reference to FIG. 1B. This black mask 830 may be covered with an insulator, and data lines and scan lines deposited on top of the black mask 830. Also on top of the black mask 830 are the driving transistors (illustrated further below) which may have output vias 840 that connect to the center layer 806 of each display element. The bottom electrodes 804 may be deposited over the black mask 830, data lines, scan lines, and thin film transistors in strips along rows of viewing areas 834.

Figure 7B:
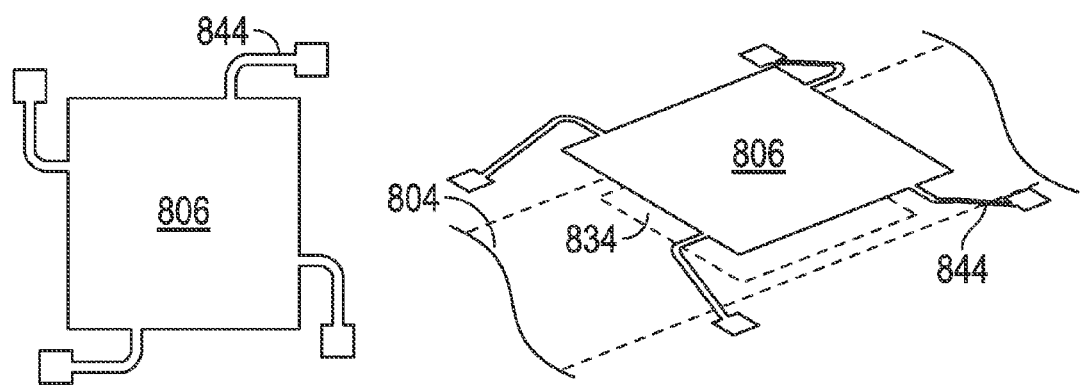
FIG. 7B shows an overhead and an isometric view of an interferometric modulator and posts for use in a display element array.

FIG. 7B shows an overhead and an isometric view of an interferometric modulator and posts for use in a display element array. The movable electrode 806 may be mechanically suspended over the stationary electrode and the substrate 820 on arms 844. The movable electrode 806 may be coupled to more than one arm, e.g., four arms as shown in FIG. 7B. Mechanical suspension using four arms 844 or a symmetrical layout of arms 844 may increase the stability of the movable electrode 806. In the implementation of FIG. 7B, the arms are connected to the output via 840 over the black mask 830 at or near the intersection between a row line and a column line of the black mask 830. The arms 844 may be connected to the movable electrode 806 at a location that is not directly over the output via 840 along the z-axis. The arms 844 may therefore be at an angle between the plane of the substrate 820 and the z-axis.

In an implementation according to FIGS. 7A and 7B, the arms 844 and vias 840 may connect at the corners of the viewing areas 834. Although multiple arms 844 connected to center layers 806 of different display elements may all be mechanically coupled at a given output via 840, only one of the arms will be electrically connected to each output via 840. Strips of top electrode material 802 (not shown) may be suspended on posts (also not shown) above the center electrode layers 806 extending along rows similar to and aligned with the bottom electrodes 804 that are deposited on the substrate, although it will be appreciated that the top electrodes need not be partially reflective as are the bottom electrodes 802, and can be made instead with a thicker metal layer of aluminum or other metal.

In the arrays of FIG. 7A, a black mask is first deposited on a substrate, followed by drive lines and transistors, followed by MEMS display element layers. The black mask 830 may be a black or opaque coating and may be applied by deposition, etching, lithography, and/or other micromachining processes. The black mask 830 layer be formed or patterned to block all light or to block certain wavelengths of light in certain directions. Other implementations for forming the black mask and circuitry layers are possible. For example, the thin film transistors and drive lines may be deposited last, on top of the MEMS display element layers. In another implementation, the thin film transistors can be deposited on the underside of a back plate that is positioned above the MEMS display element layers. In yet another alternative implementation, the thin film transistors and drive lines can be formed on the substrate first, under the black mask and the MEMS display elements, and the device can be viewed through a transparent backplate provided above the deposited MEMS display element layers.

Figure 8:
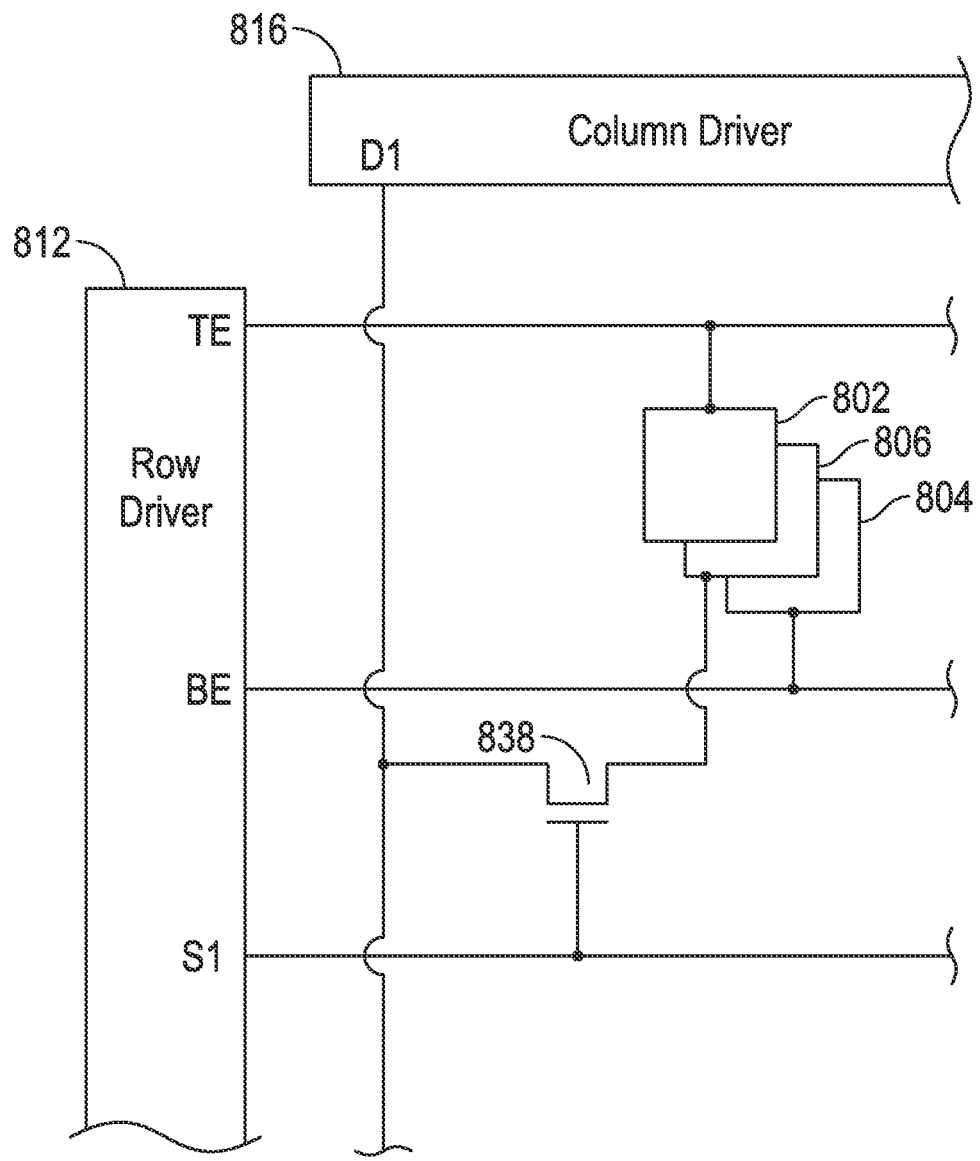
FIG. 8 shows an example of a schematic circuit diagram illustrating a driving circuit for an array of interferometric modulators.

FIG. 8 shows an example of a schematic circuit diagram illustrating a driving circuit for an array of interferometric modulators, the same circuit as is also illustrated in FIGS. 4 and 6. The display element includes two stationary electrodes, e.g. a top electrode 802 and a bottom electrode 804 and a movable electrode 806. The top electrode may be in communication with a row driver circuit 812, where the communication is represented by electrical connection in the circuit to TE. The bottom electrode may be in communication with the row driver circuit 812, where the communication is represented by electrical connection in the circuit to BE. The source electrode of the drive transistor may be connected to a data line D1 driven by column driver 816. The gate electrode of the drive transistor may be connected to a scan line S1 driven by the row driver 812. The drain electrode may be connected to the movable electrode 806. The drive transistor 838 may be used to connect a data write voltage applied to data line D1 to the center electrode 806 when scan line S1 is asserted during a writing stage. The write data voltage may apply variable charge Q to this electrode 806. FIG. 8 shows one display element in a display array, but it will be appreciated that the data line D1 connects to each source electrode of a transistor associated with each display element in a column of display elements, and the scan line S1 connects to the gate of each transistor associated with each display element in a row of display elements. This is similarly true of the schematic circuits of individual display elements of an array illustrated in other Figures described below.

FIG. 9A shows an example of a schematic circuit diagram illustrating a driving circuit for an array of interferometric modulators. The circuit of FIG. 9A includes two transistors per display element. FIG. 9A shows one display element in a display array. The display element includes two stationary electrodes, e.g. a top electrode 802 and a bottom electrode 804 and an image input electrode, e.g. movable electrode 806. The top electrode 802 may be in communication with a row driver circuit 820, where the communication is represented by electrical connection in the circuit to TE1. The bottom electrode 804 may be in communication with the row driver circuit 820, where the communication is represented by electrical connection in the circuit to BE1. The display element in this implementation further includes two associated drive transistors. The source electrode of the first drive transistor 838, or the write drive transistor, may be connected to a data line D1 driven by column driver 824. The gate electrode of the first drive transistor 838 may be connected to a scan line SD1 driven by row driver 820. The drain electrode of the first drive transistor 838 may be connected to the movable electrode 806. The source electrode of the second drive transistor 839, or the reset drive transistor, may be connected to a reset line R1 driven by column driver 824. The gate electrode of the second drive transistor 839 may be connected to a scan reset line SR1 driven by row driver 820. The drain electrode of the second drive transistor 839 may be connected to the movable electrode 806.

The drive transistor 838 may be used to connect a data write voltage applied to data line D1 to the movable electrode 806 when scan line SD1 is asserted during a writing stage. The write data voltage may apply variable charge Q to the movable electrode 806. The drive transistor 839 may be used to connect a reset voltage applied to reset line R1 to the center electrode 806 when scan line SR1 is asserted during a reset stage. In some implementations, the reset lines for all the columns of the array may be ganged together and tied to ground or another suitable voltage level. A voltage $V_0$ may be applied between the top electrode 802 and bottom electrode 804 during a bias stage.

Figure 9B:
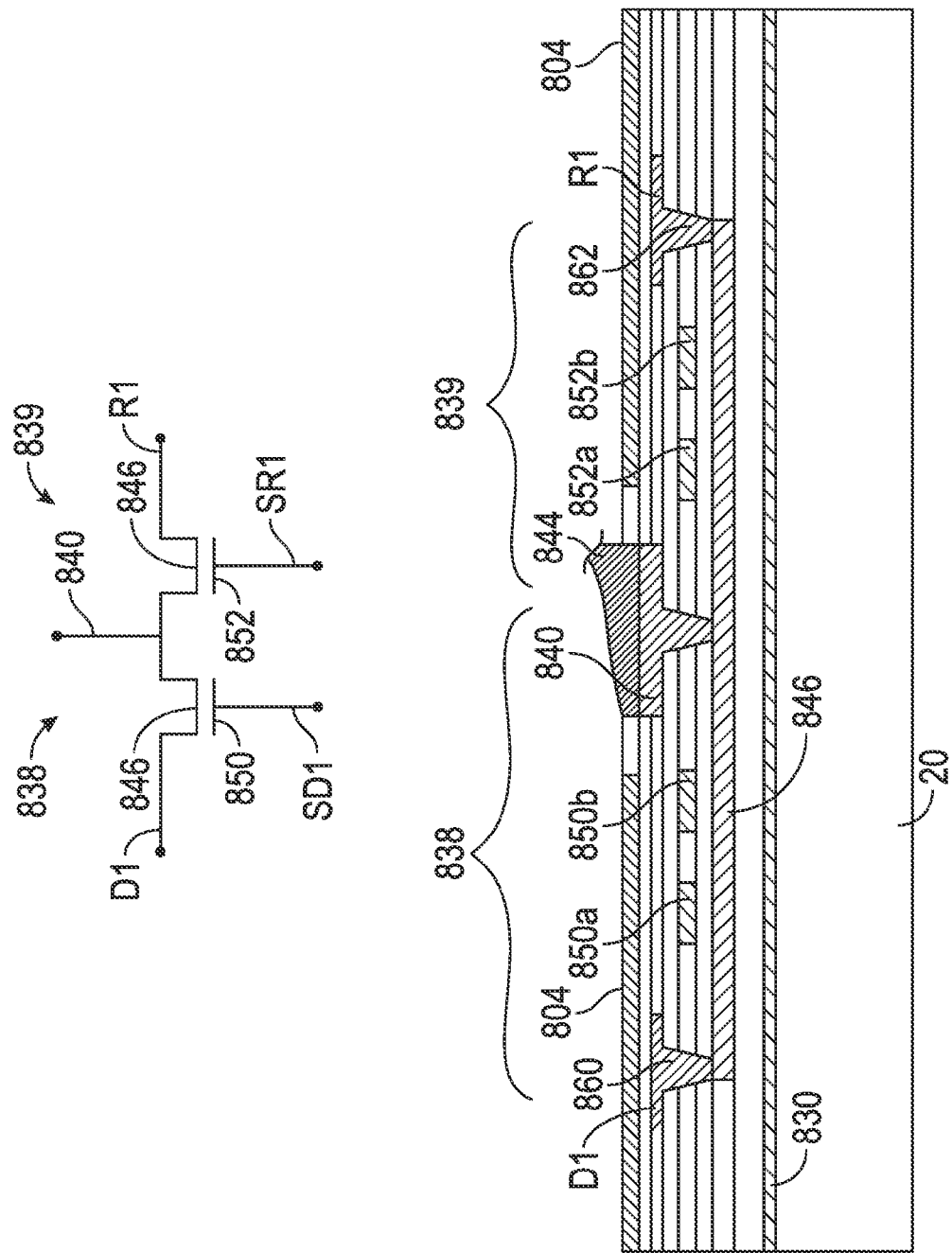
FIG. 9B shows a cross-section of a black mask row according to the implementation of FIG. 9A.

FIG. 9B shows a cross-section of a portion of the display array of FIG. 9A illustrating the components of the transistors 838 and 839. This is one example of a display array implemented with top-gate polysilicon thin-film transistors. In the implementation of FIG. 9B, the two data lines D1 and R1 run in one direction (into the page of FIG. 9B), and the two scan lines SD1 and SR1 run orthogonal to these. A linear polysilicon strip 846 runs parallel to in between the scan lines. This strip 846 forms channels for both drive transistors 838 and 839. Data line D1 is connected to a via 860 that couples D1 to the polysilicon channel 846 near one end thereof, e.g., the source electrode of the write drive transistor 838. Data line R1 is connected to a via 862 that couples R1 to the polysilicon channel 846 near the other end thereof, e.g., the source electrode of the reset drive transistor 839. Output via 840 is positioned at the side of the display element near the center of the polysilicon strip 846. Scan line SD1 is connected to gates 850a and 850b by short orthogonal extensions of scan line SD1 that extend out from SD1 to overlay polysilicon layer 846 between output via 840 and via 860. Scan line SR1 is connected to gates 852a and 852b by short orthogonal extensions of scan line SR1 that extend out from SR1 to overlay polysilicon layer 846 between via 840 and via 862. Output via 840 may be connected to an input of the image input electrode, e.g., an arm 844 of a movable electrode 806. This two gate structure (with both gates connected to a common input signal) is one example of a thin film transistor configuration that has leakage current reduction benefits in some cases.

Figure 10B:
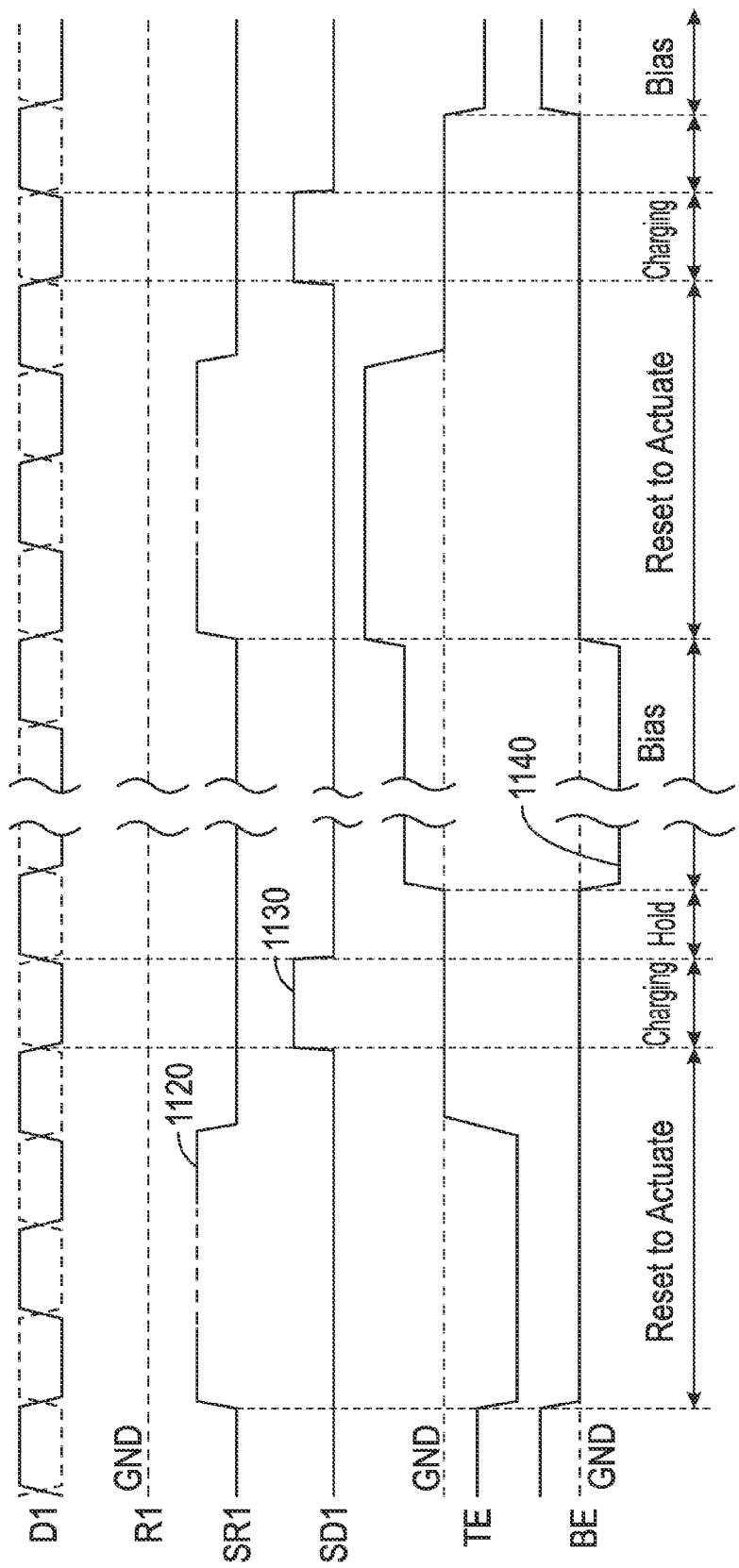

FIGS. 10A and 10B are timing diagrams illustrating data and scan line signals and top and bottom electrode voltages that may be used to write data to display elements in the two transistor implementation of FIG. 9A.

Turning now to FIG. 10A, in these implementations, the process of writing image data to a row of display elements may include three fundamental phases. During a "reset stage," a ground voltage (or other suitable voltage level) may be applied to the reset line R1 (line R1 may be grounded in all stages) and a voltage may be applied to scan line SR in time period 1120 to switch on the reset drive transistor 839. The ground voltage may be applied to the movable electrode 806. At the beginning of this reset phase, the voltages on the top electrode 802 and bottom electrode 804 may also be brought to ground. This removes all charge from all the electrodes of the display elements along the row, and the movable electrodes 806 along the row may then reset to the equilibrium state, centered between the top electrode 802 and bottom electrode 804. Then, the voltage on scan line SR may be returned to a gate off voltage, which may be ground voltage, switching off the reset drive transistor 839.

During the charging stage time period 1130, an image data voltage may be applied to the data line D1 and a voltage may be applied to scan line S1 to switch on the write drive transistor 838. The image data voltage may be applied to the movable electrode 806, causing charge Q to accumulate on the movable electrode 806. The charge Q for each display element along the row is selected based on the desired final state of the movable electrode 806 after the write procedure is complete. The voltage applied to data line D1 is selected to place this charge on the movable electrode according the formula $V_{D1}=Q/2C_0$, since there are two capacitors of known capacitance $C_0$ connected between the movable electrode 806 and grounded electrodes TE/BE when $V_{D1}$ is applied. This charging stage can be relatively fast compared to the mechanical response time of the movable layer 806, so that if this charging time is limited, any position changes to the movable electrode 806 may also be limited as this charge is applied. Furthermore, as noted above, as long as the applied charge Q is less than $Q_{cr}$, the mechanical restoring force will maintain the movable electrode in the center position while zero volts are present on the top electrode 802 and the bottom electrode 804. This is one advantage of performing the charging stage while the top electrode and bottom electrode are held at zero volts, rather than performing the charging with these electrodes at their bias voltages. After charge Q is applied, the voltage on scan line S1 may be returned to a gate off voltage, switching off the drive transistor 838.

During the bias stage time period 1140, a voltage $V_0$ may be applied across the top electrode line TE and the bottom electrode line BE. In the waveforms of FIG. 10A, this is done by applying $-V_0/2$ to the top electrode 802, and applying $+V_0/2$ to the bottom electrode 804. As noted above, it is advantageous to apply this voltage after the charging stage is complete to minimize any premature motion of the movable electrode 806 during the charging stage. Another advantage to maintaining the top and bottom electrodes at zero voltage during the charging stage rather than maintaining them at the bias voltage is that it provides a stepwise transition through zero when alternating which stationary electrode is at a higher relative voltage (e.g. which is at $+V_0/2$ and which is at $+V_0/2$). This polarity switching between write cycles as illustrated in FIG. 10A is advantageous for reducing charge buildup on the devices. Depending on the charge Q placed on the movable electrode during the charging stage period 1130, the display element will then move to a final position x in accordance with the formula of Equation 1, and produce an optical response in accordance with the image information.

It may be noted that the reset stage period 1120 is longer than the write period 1130 in the current example. Although the electrical response of the display element is fast, the longer time period of reset stage allows the display element to mechanically move from its prior position (set there in accordance with image data from the previous frame) to the reset equilibrium position, which takes a longer time than the actual charge transfer resulting from applied voltages to the electrodes. In this implementation, the reset phase for any given row can be pipelined with the charge and bias stages of other rows such that when one row is being reset, other rows may be charged and biased.

FIG. 10B is a timing diagram illustrating an alternative implementation where the movable electrode 806 is reset to a state other than the central equilibrium state. In this implementation, during the reset stage, a ground voltage may be applied to the data line R1 and a voltage may be applied to scan line SR to switch on the reset drive transistor 839. The ground voltage on R1 may thus be applied to the movable electrode 806. As noted above, the voltage applied to data line D1 may change to a non-zero voltage (e.g. for charging other rows of the display array) during the reset stage without causing a charge to be delivered to the image input electrode if no voltage sufficient to switch on write drive transistor 838 is applied to scan line S1. In addition, a ground voltage may be applied to the bottom electrode and a non-zero voltage may be applied to the top electrode, which causes the movable electrode 806 to be pulled toward and against the top electrode 802 (an insulating layer is provided between to prevent any short circuit).

During the charging stage, the voltage on the top electrode 802 is returned to zero, an image data voltage as described above may be applied to the data line D1 and a voltage may be applied to scan line SD1 to switch on the write drive transistor 838. The image voltage may be applied to the movable electrode 806, causing charge Q to accumulate on the image input electrode. After charge Q is applied, the voltage on scan line SD1 may be returned to a ground voltage, switching off the drive transistor. In this case, the applied voltage $V_{D1}$ is calculated according to $V_{D1}=Q/(C_1+C_2)$, where $C_1$ is the capacitance of the capacitor formed by the movable electrode 806 and the top electrode 802, and $C_2$ is the capacitance of the capacitor formed by the movable electrode 806 and the bottom electrode 804, both of which are known from the known structure and dimensions of the display element. When the movable electrode 806 is pushed to the top electrode 802 or bottom electrode 804, the value of $C_1+C_2$ will generally be much larger than $2C_0$, allowing for lower data voltages $V_{D1}$ to be used to apply the same charge Q relative to the reset state in the central equilibrium position.

During the bias stage, a voltage $V_0$ may be applied across the top electrode line TE and the bottom electrode line BE. In the waveforms of FIG. 10B, this is done by applying a voltage of $-V_0/2$ to the top electrode, and applying a voltage of $+V_0/2$ to the bottom electrode. As above, depending on the charge Q placed on the movable electrode during the charging stage during time 1130, the display element will then move to a final position x in accordance with the formula of Equation 1, and produce an optical response in accordance with the image information.

Figure 10C:
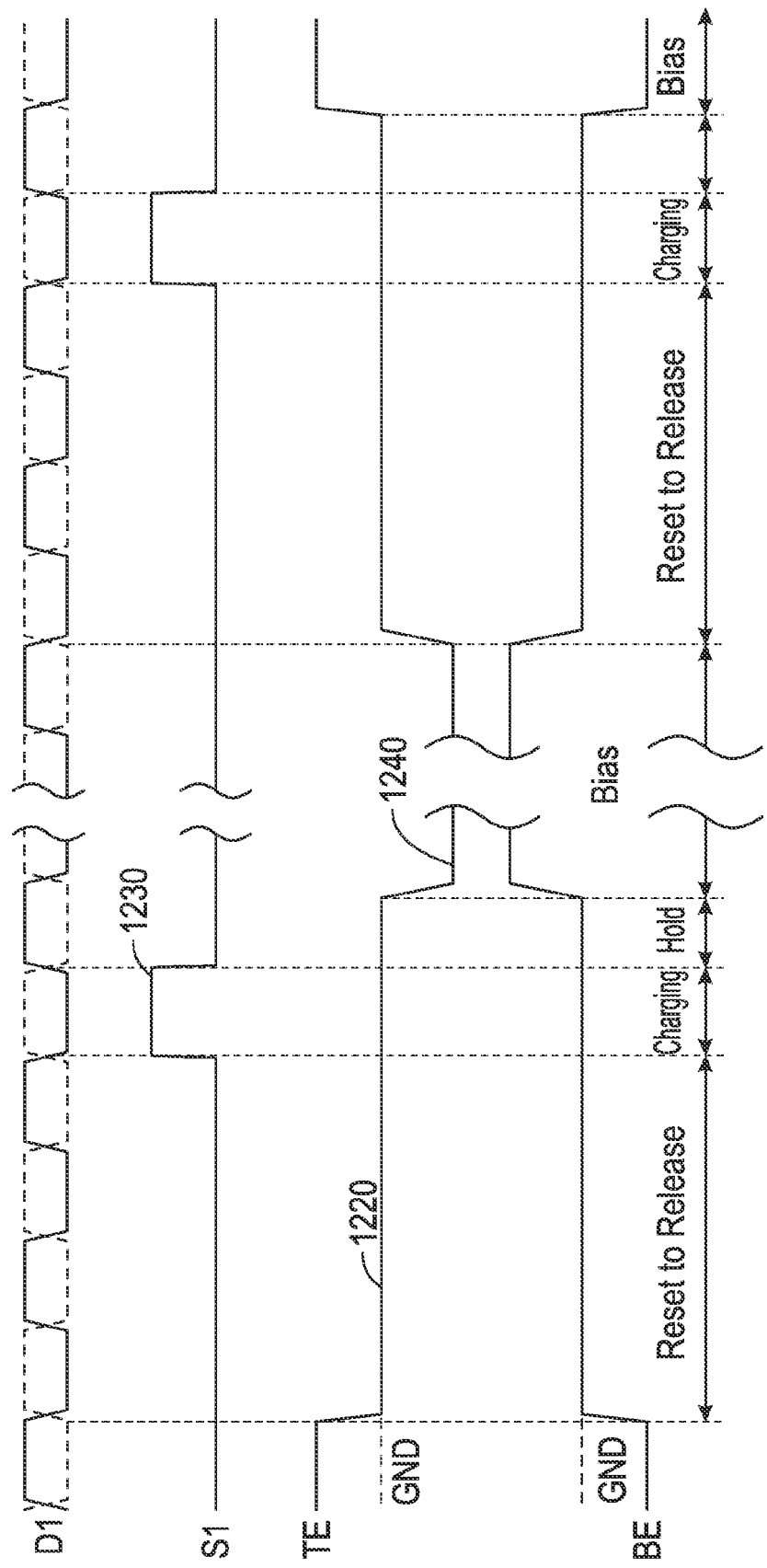
FIG. 10C is a timing diagram illustrating data and scan line signals and top and bottom electrode voltages that may be used to write data to display elements in the implementation of FIGS. 6 and 8.

FIG. 10C is a timing diagram illustrating data and scan line signals and top and bottom electrode voltages that may be used to write data to display elements in the single drive transistor implementation of FIGS. 6 and 8. In the implementation of FIG. 10C, the display elements of a row are reset to the equilibrium state without applying a reset voltage to the movable electrode 806. In this implementation, during the reset stage, ground voltages may be applied to the top electrode 802 and the bottom electrode 804 during reset time period 1220 As noted above, if the display element is positioned using charges Q that are less than $Q_{cr}$, any charge Q left on the display element from the data for the previous frame can remain there, and removing any voltage differential between the top and bottom electrodes will still cause the movable electrode 806 to move to the central equilibrium position under the influence of the mechanical restoring force. During this reset period 1220, a ground voltage may be applied to scan line SD1 to maintain a switched off state of the drive transistor 838. As with the above implementations, this release stage for this row can be pipelined with write stages for other rows since the transistors 838 for this row are off. During the charging stage at time period 1230, and with the top electrode 802 and the bottom electrode 804 still held at zero volts, an image data voltage may be applied to the data line D1 and a voltage may be applied to scan line SD1 to switch on the drive transistor 838. The image data voltage is then applied to the movable electrode 806, causing charge Q to accumulate there. After charge Q is applied, the voltage on scan line S1 may be returned to a ground voltage, switching off the drive transistor 838.

The bias stage at time period 1240 is identical to that described above, where a voltage $V_0$ may be applied across the top electrode line TE and the bottom electrode line BE, and the display elements along the row move to the desired positions.

It is possible to implement a reset stage essentially identical to that shown in FIGS. 10A and 10B with one transistor 838 as in FIGS. 6 and 8 if desired. In one such implementation, for each row, the data line D1 can go to the reset voltage (e.g. ground) during an initial reset phase, which is immediately followed by a charging phase where the voltage on D1 transitions to the voltage required to install the desired charge Q once the display elements have been reset to the desired position (e.g. in the central equilibrium position as in FIG. 10A or in the displaced position of FIG. 10B). This has drawbacks however, as a long wait time for mechanical movement to the reset position is incurred with every row written. This penalty can be reduced in a variety of ways. For example, the D1 voltage output could alternate between short duration reset voltages and write voltages, with the duration of each based on the electrical response time of the display elements rather than the mechanical response time. In this implementation, during one or more times when a reset voltage is applied to D1, a row that is several rows ahead of the current line being written may have its transistors turned on and its top electrode and bottom electrode taken to zero volts. This will remove the charge from the movable electrodes 806 along this row, and the transistors for this row can be quickly turned off. Voltages on data line D1 can then be used to charge the current row. By the time the frame write procedure reaches the row previously uncharged, it will have moved into the desired reset state, and a charging cycle can be applied to that row. The reset cycles thus move down the array ahead of the charge cycles. In another implementation, rather than alternating D1 between reset voltage and charging voltage, D1 can go to the reset voltage periodically, such as after every 5 or 10 charging cycles. During each of these reset cycles, the movable electrodes 806 of a group of rows that are several rows ahead of the row currently being written can be simultaneously uncharged by the reset voltage, and be ready for charging sequentially when the frame write procedure reaches those rows.

Figure 11A:
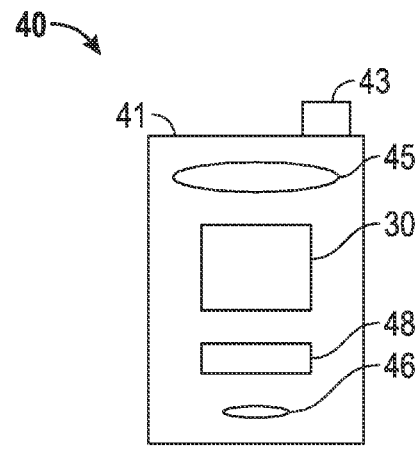
FIGS. 11A and 11B are system block diagrams illustrating a display device that includes a plurality of IMOD display elements.
Figure 11B:
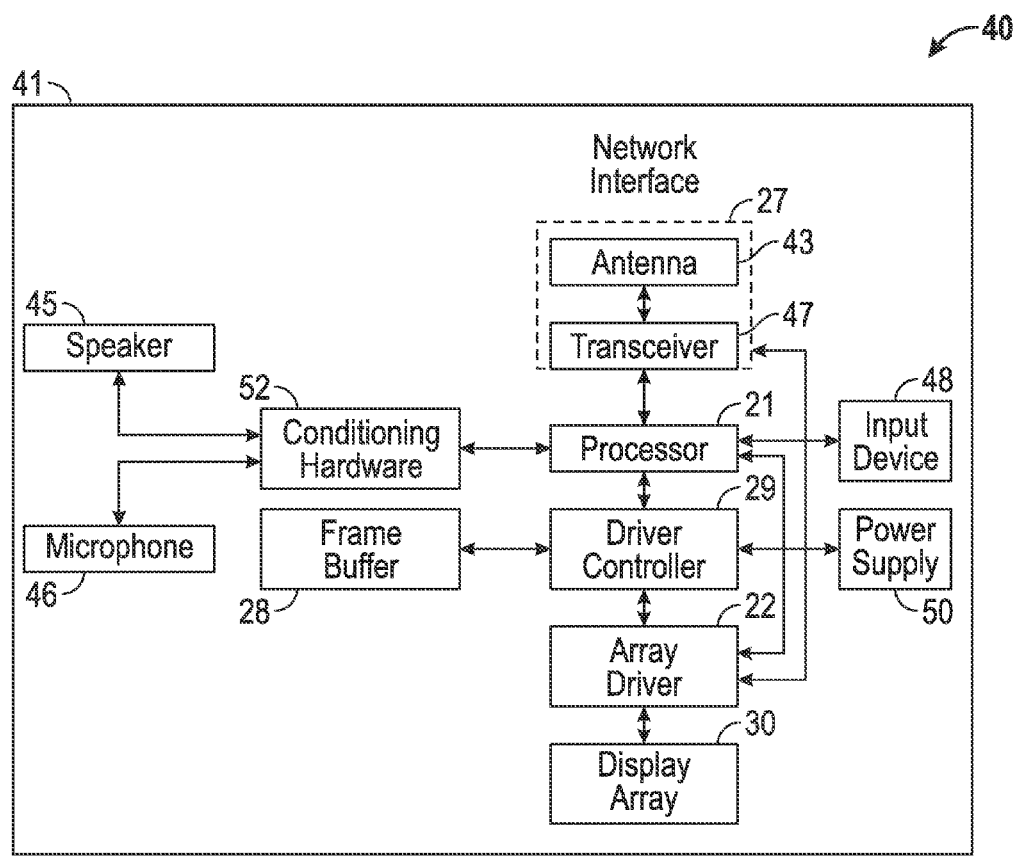

FIGS. 11A and 11B are system block diagrams illustrating a display device 40 that includes a plurality of IMOD display elements. The display device 40 can be, for example, a smart phone, a cellular or mobile telephone. However, the same components of the display device 40 or slight variations thereof are also illustrative of various types of display devices such as televisions, computers, tablets, e-readers, hand-held devices and portable media devices.

The display device 40 includes a housing 41, a display 30, an antenna 43, a speaker 45, an input device 48 and a microphone 46. The housing 41 can be formed from any of a variety of manufacturing processes, including injection molding, and vacuum forming. In addition, the housing 41 may be made from any of a variety of materials, including, but not limited to: plastic, metal, glass, rubber and ceramic, or a combination thereof. The housing 41 can include removable portions (not shown) that may be interchanged with other removable portions of different color, or containing different logos, pictures, or symbols.

The display 30 may be any of a variety of displays, including a bi-stable or analog display, as described herein. The display 30 also can be configured to include a flat-panel display, such as plasma, EL, OLED, STN LCD, or TFT LCD, or a non-flat-panel display, such as a CRT or other tube device. In addition, the display 30 can include an IMOD-based display, as described herein.

The components of the display device 40 are schematically illustrated in FIG. 11A. The display device 40 includes a housing 41 and can include additional components at least partially enclosed therein. For example, the display device 40 includes a network interface 27 that includes an antenna 43 which can be coupled to a transceiver 47. The network interface 27 may be a source for image data that could be displayed on the display device 40. Accordingly, the network interface 27 is one example of an image source module, but the processor 21 and the input device 48 also may serve as an image source module. The transceiver 47 is connected to a processor 21, which is connected to conditioning hardware 52. The conditioning hardware 52 may be configured to condition a signal (such as filter or otherwise manipulate a signal). The conditioning hardware 52 can be connected to a speaker 45 and a microphone 46. The processor 21 also can be connected to an input device 48 and a driver controller 29. The driver controller 29 can be coupled to a frame buffer 28, and to an array driver 22, which in turn can be coupled to a display array 30. One or more elements in the display device 40, including elements not specifically depicted in FIG. 11A, can be configured to function as a memory device and be configured to communicate with the processor 21. In some implementations, a power supply 50 can provide power to substantially all components in the particular display device 40 design.

The network interface 27 includes the antenna 43 and the transceiver 47 so that the display device 40 can communicate with one or more devices over a network. The network interface 27 also may have some processing capabilities to relieve, for example, data processing requirements of the processor 21. The antenna 43 can transmit and receive signals. In some implementations, the antenna 43 transmits and receives RF signals according to the IEEE 16.11 standard, including IEEE 16.11(a), (b), or (g), or the IEEE 802.11 standard, including IEEE 802.11a, b, g, n, and further implementations thereof. In some other implementations, the antenna 43 transmits and receives RF signals according to the Bluetooth® standard. In the case of a cellular telephone, the antenna 43 can be designed to receive code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless network, such as a system utilizing 3G, 4G or 5G technology. The transceiver 47 can preprocess the signals received from the antenna 43 so that they may be received by and further manipulated by the processor 21. The transceiver 47 also can process signals received from the processor 21 so that they may be transmitted from the display device 40 via the antenna 43.

In some implementations, the transceiver 47 can be replaced by a receiver. In addition, in some implementations, the network interface 27 can be replaced by an image source, which can store or generate image data to be sent to the processor 21. The processor 21 can control the overall operation of the display device 40. The processor 21 receives data, such as compressed image data from the network interface 27 or an image source, and processes the data into raw image data or into a format that can be readily processed into raw image data. The processor 21 can send the processed data to the driver controller 29 or to the frame buffer 28 for storage. Raw data typically refers to the information that identifies the image characteristics at each location within an image. For example, such image characteristics can include color, saturation and gray-scale level.

The processor 21 can include a microcontroller, CPU, or logic unit to control operation of the display device 40. The conditioning hardware 52 may include amplifiers and filters for transmitting signals to the speaker 45, and for receiving signals from the microphone 46. The conditioning hardware 52 may be discrete components within the display device 40, or may be incorporated within the processor 21 or other components.

The driver controller 29 can take the raw image data generated by the processor 21 either directly from the processor 21 or from the frame buffer 28 and can re-format the raw image data appropriately for high speed transmission to the array driver 22. In some implementations, the driver controller 29 can re-format the raw image data into a data flow having a raster-like format, such that it has a time order suitable for scanning across the display array 30. Then the driver controller 29 sends the formatted information to the array driver 22. Although a driver controller 29, such as an LCD controller, is often associated with the system processor 21 as a stand-alone Integrated Circuit (IC), such controllers may be implemented in many ways. For example, controllers may be embedded in the processor 21 as hardware, embedded in the processor 21 as software, or fully integrated in hardware with the array driver 22.

The array driver 22 can receive the formatted information from the driver controller 29 and can re-format the video data into a parallel set of waveforms that are applied many times per second to the hundreds, and sometimes thousands (or more), of leads coming from the display's x-y matrix of display elements.

In some implementations, the driver controller 29, the array driver 22, and the display array 30 are appropriate for any of the types of displays described herein. For example, the driver controller 29 can be a conventional display controller or a bi-stable display controller (such as an IMOD display element controller). Additionally, the array driver 22 can be a conventional driver or a bi-stable display driver (such as an IMOD display element driver). Moreover, the display array 30 can be a conventional display array or a bi-stable display array (such as a display including an array of IMOD display elements). In some implementations, the driver controller 29 can be integrated with the array driver 22. Such an implementation can be useful in highly integrated systems, for example, mobile phones, portable-electronic devices, watches or small-area displays.

In some implementations, the input device 48 can be configured to allow, for example, a user to control the operation of the display device 40. The input device 48 can include a keypad, such as a QWERTY keyboard or a telephone keypad, a button, a switch, a rocker, a touch-sensitive screen, a touch-sensitive screen integrated with the display array 30, or a pressure- or heat-sensitive membrane. The microphone 46 can be configured as an input device for the display device 40. In some implementations, voice commands through the microphone 46 can be used for controlling operations of the display device 40.

The power supply 50 can include a variety of energy storage devices. For example, the power supply 50 can be a rechargeable battery, such as a nickel-cadmium battery or a lithium-ion battery. In implementations using a rechargeable battery, the rechargeable battery may be chargeable using power coming from, for example, a wall socket or a photovoltaic device or array. Alternatively, the rechargeable battery can be wirelessly chargeable. The power supply 50 also can be a renewable energy source, a capacitor, or a solar cell, including a plastic solar cell or solar-cell paint. The power supply 50 also can be configured to receive power from a wall outlet.

In some implementations, control programmability resides in the driver controller 29 which can be located in several places in the electronic display system. In some other implementations, control programmability resides in the array driver 22. The above-described optimization may be implemented in any number of hardware and/or software components and in various configurations.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and steps described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular steps and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein. Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of, e.g., an IMOD display element as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, a person having ordinary skill in the art will readily recognize that such operations need not be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method of writing image data to an electromechanical display element to place the electromechanical display element into a defined display state, the display element including at least one stationary electrode and a movable electrode, the method comprising:
  applying a first voltage to the at least one stationary electrode during a reset period;
  applying a second voltage to the at least one stationary electrode during a charging period following the reset period;
  applying a third voltage to the movable electrode during the charging period to charge the movable electrode with a charge Q defined at least in part by the third voltage;
  applying a fourth voltage different from the second voltage to the at least one stationary electrode during a bias period following the charging period; and
  electrically isolating the movable electrode during the bias period,
  wherein the electromechanical display element includes first and second stationary electrodes,
  wherein the movable electrode is positioned between the first and second stationary electrodes,
  wherein the first voltage, second voltage, and fourth voltage are a first voltage differential, a second voltage differential, and a fourth voltage differential applied across the first stationary electrode and the second stationary electrode,
  wherein the first voltage differential is substantially zero, and
  wherein the movable electrode is electrically isolated during the reset period.

2. The method of claim 1, wherein the second voltage is substantially zero, and wherein the fourth voltage is non-zero.

3. The method of claim 1, further comprising applying a fifth voltage to the movable electrode during at least a portion of the reset period.

4. The method of claim 3, wherein the first voltage is substantially zero.

5. The method of claim 4, wherein the fifth voltage is substantially zero.

6. The method of claim 3, wherein the first, second, and fifth voltages are substantially zero, and wherein the third and fourth voltages are non-zero.

7. The method of claim 1, further comprising applying a fifth voltage to the movable electrode during at least a portion of the reset period.

8. The method of claim 7, wherein the fifth voltage is substantially zero.

9. The method of claim 8, wherein during the reset period, the movable electrode is placed in a reset state that is approximately centrally located between the first stationary electrode and the second stationary electrode.

10. The method of claim 1, wherein during the reset period, the movable electrode is placed in a reset state that is approximately centrally located between the first stationary electrode and the second stationary electrode.

11. The method of claim 8, wherein the first voltage differential is non-zero.

12. The method of claim 10, wherein during the reset period, the movable electrode is placed in a reset position that is nearer to the first stationary electrode than the second stationary electrode.

13. The method of claim 1, further comprising electrically isolating the movable electrode during a hold period following the charging period and prior to the bias period during which the second voltage differential is applied to the first and second stationary electrodes.

14. A display apparatus comprising:
  an array of electromechanical display elements, each electromechanical display element including at least one stationary electrode and a movable electrode;
  a driver circuit coupled to the array and configured to:
    apply a first voltage to the at least one stationary electrode during a reset period;
    apply a second voltage to the at least one stationary electrode during a charging period following the reset period;
    apply a third voltage to the movable electrode during the charging period to charge the movable electrode with a charge Q defined at least in part by the third voltage;
    apply a fourth voltage different from the second voltage to the at least one stationary electrode during a bias period following the charging period; and
  electrically isolate the movable electrode during the bias period,
  wherein the electromechanical display element includes first and second stationary electrodes,
  wherein the movable electrode is positioned between the first and second stationary electrodes,
  wherein the first voltage, second voltage, and fourth voltage are a first voltage differential, a second voltage differential, and a fourth voltage differential applied across the first stationary electrode and the second stationary electrode,
  wherein the first voltage differential is substantially zero, and
  wherein the movable electrode is electrically isolated during the reset period.

15. The display apparatus of claim 14, wherein the first and second stationary electrodes are formed as parallel strips of conductive material connected to the driver circuit.

16. The display apparatus of claim 15, wherein the movable electrode is supported between the parallel strips of conductive material on conductive support arms attached to a substrate.

17. The display apparatus of claim 16, wherein the support arms provide a conductive connection between one or more drive transistors and the movable electrode.

18. The display apparatus of claim 14, further comprising:
  a processor that is configured to communicate with the driver circuit, the processor being configured to process image data; and
  a memory device that is configured to communicate with the processor.

19. The display apparatus of claim 18, further comprising:
  a controller configured to send at least a portion of the image data to the driver circuit.

20. The display apparatus of claim 18, further comprising an image source module configured to send the image data to the processor, wherein the image source module comprises at least one of a receiver, transceiver, and transmitter.

21. The display apparatus of claim 18, further comprising an input device configured to receive input data and to communicate the input data to the processor.

22. A display apparatus comprising:
- an array of electromechanical display elements, each electromechanical display element including at least one stationary electrode and a movable electrode;
- means for applying resetting voltages to the at least one stationary electrode for resetting display elements of the array;
- means for applying charging voltages to the at least one stationary electrode and movable electrode for charging the movable electrodes of the display elements of the array;
- means for applying biasing voltages to the at least one stationary electrode different from the charging voltages applied to the at least one stationary electrode for setting display elements of the array to a defined display state,
- wherein the electromechanical display element includes first and second stationary electrodes,
- wherein the movable electrode is positioned between the first and second stationary electrodes,
- wherein the resetting voltages, the charging voltages, and the biasing voltages applied to the at least one stationary electrode are a resetting voltage differential, a charging voltage differential, and a biasing voltage differential applied across the first stationary electrode and the second stationary electrode,
- wherein the resetting voltage differential applied to the at least one stationary electrode is substantially zero, and
- wherein the movable electrode is electrically isolated when display elements of the array are reset.

23. The display apparatus of claim 22, wherein the means for applying resetting voltages, charging voltages, and biasing voltages includes a driver circuit.

* * * * *